(12) United States Patent
Elkasabi et al.

(10) Patent No.: US 11,060,033 B2
(45) Date of Patent: Jul. 13, 2021

(54) COMPOSITIONS AND METHODS FOR PRODUCING CALCINED COKE FROM BIORENEWABLE SOURCES

(71) Applicants: The United States of America, as represented by the Secretary of Agriculture, Washington, DC (US); RIO TINTO ALCAN INTERNATIONAL, LTD., Jonquiere Quebec (CA)

(72) Inventors: Yaseen M. Elkasabi, Plymouth Meeting, PA (US); Hans Darmstadt, Jonquiere (CA); Akwasi Boateng, Royersford, PA (US)

(73) Assignees: The United States of America, as represented by The Secretary of Agriculture, Washington, DC (US); Rio Tinto Alcan Inc., Quebec (CA)

( * ) Notice: Subject to any disclaimer, the term of this patent is extended or adjusted under 35 U.S.C. 154(b) by 0 days.

(21) Appl. No.: 16/017,525

(22) Filed: Jun. 25, 2018

(65) Prior Publication Data
US 2018/0371323 A1    Dec. 27, 2018

Related U.S. Application Data

(60) Provisional application No. 62/524,226, filed on Jun. 23, 2017.

(51) Int. Cl.
| | | |
|---|---|---|
| C10B 53/02 | (2006.01) | |
| C10B 57/00 | (2006.01) | |
| B01D 3/10 | (2006.01) | |
| C10B 57/16 | (2006.01) | |
| C10B 57/02 | (2006.01) | |
| C01B 32/05 | (2017.01) | |
| C10L 9/08 | (2006.01) | |

(52) U.S. Cl.
CPC ............. *C10B 53/02* (2013.01); *B01D 3/10* (2013.01); *C01B 32/05* (2017.08); *C10B 57/005* (2013.01); *C10B 57/02* (2013.01); *C10B 57/16* (2013.01); *C10L 9/08* (2013.01)

(58) Field of Classification Search
CPC ......... C10L 9/08; C10B 57/005; C10B 57/16; C10B 57/02; B01D 3/10
See application file for complete search history.

(56) References Cited

U.S. PATENT DOCUMENTS

| | | | | |
|---|---|---|---|---|
| 4,444,650 A | * | 4/1984 | Glaser | ............... C10B 55/00 208/106 |
| 4,534,949 A | * | 8/1985 | Glaser | ............... C04B 35/528 264/29.1 |

(Continued)

OTHER PUBLICATIONS

Elkasabi et al.; "Upgrading of bio-oil distillation bottoms into biorenewable calcined coke", Biomass and Bioenergy 81 (2015) 415-423. (Year: 2015).*

(Continued)

*Primary Examiner* — Ali Z Fadhel
(74) *Attorney, Agent, or Firm* — John D Fado; G. Byron Stover

(57) ABSTRACT

Disclosed are methods of producing calcined coke from bio-oil from a biomass feedstock. Also disclosed are calcined cokes produced by such methods having desirable structural characteristics.

26 Claims, 17 Drawing Sheets
(2 of 17 Drawing Sheet(s) Filed in Color)

(56) References Cited

U.S. PATENT DOCUMENTS

| | | | |
|---|---|---|---|
| 4,645,589 A | | 2/1987 | Krambeck et al. |
| 4,740,293 A | * | 4/1988 | Dickinson ............. C10B 57/045 208/131 |
| 5,158,668 A | * | 10/1992 | Chahar ................... C10B 55/00 208/131 |
| 5,186,722 A | | 2/1993 | Cantrell et al. |
| 6,168,709 B1 | | 1/2001 | Etter et al. |
| 7,638,040 B2 | | 12/2009 | Van Wees et al. |
| 9,343,885 B2 | | 9/2016 | Mullen et al. |
| 2002/0179493 A1 | * | 12/2002 | Etter ....................... C10B 55/00 208/131 |
| 2009/0031615 A1 | | 2/2009 | Joshi et al. |
| 2009/0259082 A1 | | 10/2009 | Deluga et al. |
| 2010/0256428 A1 | | 10/2010 | Marker et al. |
| 2011/0119996 A1 | | 5/2011 | Heimann et al. |
| 2011/0232164 A1 | | 9/2011 | Siskin et al. |
| 2012/0080358 A1 | * | 4/2012 | Stiller ..................... C10B 55/00 208/434 |
| 2012/0091043 A1 | * | 4/2012 | Stiller ..................... C10L 10/10 208/435 |
| 2012/0091044 A1 | * | 4/2012 | Stiller ..................... C10G 1/045 208/435 |
| 2012/0110901 A1 | | 5/2012 | Olivier et al. |

OTHER PUBLICATIONS

Elkasabi et al.; "Distillation and Isolation of Commodity Chemicals from Bio-Oil Made by Tail-Gas Reactive Pyrolysis", ACS Sustainable Chem. Eng. 2014, 2, 2042-2052. (Year: 2014).*

* cited by examiner

Legend:
——— H2O     ········ CO     ━━ ━ CO2     ═══ O2

Legend:

......... SwG-bottoms    — — SwG-deV    ———— SwG-CC

COMPOSITIONS AND METHODS FOR PRODUCING CALCINED COKE FROM BIORENEWABLE SOURCES

CROSS REFERENCE TO RELATED APPLICATION

This application claims priority to U.S. Provisional Patent Application Ser. No. 62/524,226, filed Jun. 23, 2017, the content of which is incorporated herein by reference in its entirety.

FIELD OF THE INVENTION

The disclosed invention relates generally to novel and improved methods of making coke products from biomass-derived oils. More specifically, the invention relates to methods of synthesizing biomass-derived calcined coke having desirable structures and characteristics from byproducts of bio-oil distillation.

BACKGROUND OF THE INVENTION

As worldwide consumption of liquid transportation fuels outpaces the finite supply of fossil fuels, significant research focuses on replacements for such petroleum-based fuels (see e.g., Mangla, V. et al., Curr. Chem. Biol., 7: 96-103 (2013); Sorrell, S., et al., Energy Policy, 38: 5290-5295 (2010)). Although finished motor fuels comprise the bulk of petrochemical refinery outputs, the world economy also relies heavily on many everyday products that emanate from petroleum (see e.g., U.S. Environmental Protection Agency, http://www.eia.gov/dnav/pet/pet_cons_psup_dc_nus_mb-bl_a.htm). Some basic examples include commodity chemicals like benzene-toluene-ethylbenzene-xylenes (BTEX) petrochemical feedstock; phenolic resins for plastics, waxes, and lubricants; and asphalt for roofing and road pavement. Altogether, non-fuels co-products comprise about 15-20% of all petroleum products (U.S. Environmental Protection Agency, http://www.eia.gov/dnav/pet/pet_cons_psup_dc_nus_mbbl_a.htm). Furthermore, many petrochemical refineries generally rely on non-fuels applications for the majority of their product sales. Therefore, a strategy for renewable fuels must be coupled with a strategy to bring economic value via petrochemical co-product replacements. As an example, production of biodiesel was found to be economically viable due to the feasibility of producing glycerol in parallel (see Haas, M. J., et al., Bioresource Technol., 97: 671-678 (2006); Lopes, D. C., et al., Energ. Econ., 40: 819-824 (2013)).

One of the most crucial yet least-discussed petroleum co-products of value is petroleum coke (sometimes referred to as "petcoke"). Typically, residuals remaining after vacuum distillation of petroleum are sent to a delayed coker unit, which thermally cracks the residuals into petcoke and lighter fuel components (see e.g., Olsen, T., "Chemical and Engineering Practice," An Oil Refinery Walk-Through, pp. 34-40, May 2014). Petcoke is sometimes used as a fuel without further refining or, if the metals and sulfur contents are low enough, calcined into coke suitable for use in other applications such as, for example, aluminum smelting anodes, steel carburization, and titanium dioxide production. Aluminum smelting alone may absorb more than 70% of the petcoke market (see e.g., Zhang, Z., and T. Wang, J. Therm. Sci. Eng. App., 2: 021006-1-021006-8 (2010); Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000). Other high-volume markets for calcined coke use the remaining 30% for production of, for example, graphite, steel, and titanium dioxide (see e.g., Ellis and Paul 2000; Paul, C. A., and L. E. Herrington, "Desulfurization of petroleum coke beyond 1600° C.," In Light Metals: Proceedings of Sessions, TMS Annual Meeting, Warrendale, Pa., 597-601, 2001). Globally, about 50M ton/year of aluminum are produced from approximately 25M tons of carbon per year, and low-quality coke can increase industry costs more than an estimated $100/metric ton of aluminum product (see e.g., "The carbon anode market—a global viewpoint (Interview with Michael Wrotniak, CEO of Aminco Resources)," Aluminum, June 2014; Alcoa Inc., "Aluminum smelting technical article," http://www.alcoa.com/global/en/about_alcoa/pdf/Smeltingpaper.pdf). Petcoke demand continues to rise annually, for which the U.S. provides more than half the global supply, and the market has gone wanting for sources that are renewable due to several sustainability factors (see e.g., "Asian demand spurs U.S. net exports of petroleum coke to higher levels in early 2012," Petroleum Supply Monthly, U.S. Energy Information Administration, 25 May 2012, http://www.eia.gov/todayinenergy/detail.cfm?id=6430#; Chmelar, J., Size reduction and specification of granular petrol coke with respect to chemical and physical properties, Doctoral thesis, Norwegian University of Science and Technology, 2006).

Industrial and commercial demand for high-quality calcined coke is hampered by the often low quality of petcoke, mainly due to undesirably high sulfur and metals content such as Ni and V (see e.g., Edwards, L. C., "Responding to Changes in Coke Quality," In Proceedings of the 10th Australasian Smelting Technology Conference, Terrigal, NSW," 2007; Edwards, L. C., et al., "A review of coke and anode desulfurization," In Light Metals, Wiley, 2007). In addition, the need to desulfurize calcined coke to meet industrial application demands increases processing costs. Although aluminum smelting can tolerate up to about 3% sulfur content, further reduction of sulfur is desired due to the corrosive nature of sulfur during the smelting process, which reduces anode lifetime (see e.g., Edwards, L., "Impurity level distribution in gpc and cpc and impact on anode properties," In Light Metals 2014: The Minerals, Metals, & Materials Society, Wiley, 2014, pp. 1093-1098). Even 1% sulfur may cause brittleness and have severe negative impacts on the mechanical properties of steel anodes.

Carbon anodes for the industrial process of smelting aluminum, for example, are typically made of non-renewable materials, such as petroleum coke and coal tar pitch, which creates a substantial carbon footprint. One option to reduce this carbon footprint is to use renewable, biomass-derived anode raw materials. In this case, the $CO_2$ generated during electrolysis would be compensated by the $CO_2$ captured during biomass growth. Biomass can be transformed by pyrolysis (heat-treatment in an oxygen-poor atmosphere) into a solid residue (i.e., char), oil, and gas. However, the corresponding cokes typically contain undesirable oxidation catalysts (alkali and alkaline earth metals), are high in oxygen (reducing carbon available for electrolysis), have undesirable isotropic textures, and also have low bulk densities. While previous attempts to produce biorenewable versions of calcined coke address $CO_2$ footprint, sulphur and metals poisoning, none have demonstrated a sufficient degree of anisotropy, which is critical for performance in, for example, aluminium smelting anodes and other industrial uses.

There thus exists an industrial and commercial need to develop improved methods of producing coke having acceptable levels of impurities and desirable textures from biomass-derived sources. A particular need exists for biorenewable calcined coke having suitable textural characteristics for use in a variety of industrial applications, such as aluminium smelting processes, electrodes for electric arc furnaces, graphite production, among others.

SUMMARY OF THE INVENTION

To address these challenging shortcomings of the current state of the art, the present invention accordingly provides methods of producing cokes from biomass-derived oils. The corresponding cokes are surprisingly low in undesired impurities (e.g., sulphur, vanadium, and nickel) and have industrially acceptable levels of other contaminants, such as oxygen, alkali, and alkaline earth metals. Using appropriate conditions as disclosed herein, cokes with desired desirable textural characteristics including, for example, anisotropic texture for aluminium smelting and other industrial applications can be efficiently and economically produced using biomass-derived oils.

In an aspect, the invention includes methods of producing calcined coke from a bio-oil derived from a biomass feedstock. The method includes (a) subjecting the bio-oil to atmospheric distillation in a batch or continuous distillation unit and/or subsequently to vacuum distillation in a batch or continuous vacuum distillation unit to produce a bio-oil distillation residue; (b) subjecting the bio-oil distillation residue to a temperature and a time sufficient for carbonaceous domains to align and crystallize; (c) optionally further densifying the carbonaceous domains at up to about 400° C. to produce a calcination-ready coke product; (d) optionally devolatilizing the calcination-ready coke product; and (e) calcining the calcination-ready coke product to produce an anisotropic coke product. Also disclosed are calcined cokes produced by such methods.

In other aspects, disclosed are methods of producing calcined coke from bio-oil derived from a biomass feedstock, involving (1) subjecting the bio-oil to atmospheric distillation in a batch or continuous distillation unit and/or subsequently to vacuum distillation in a batch or continuous vacuum distillation unit to produce coke (i.e. distillation bottoms), (2) subjecting the coke bottoms to (a) stepwise calcination at about 400° C. to about 1,000° C. for about 1 to about 30 minutes in an inert gas atmosphere in a reactor to produce devolatilized coke, optionally cooling the devolatilized coke, removing the devolatilized coke from the reactor and optionally crushing the devolatilized coke, and stepwise calcining the devolatilized coke at about 1,200° C. to about 1,400° C. for up to about 2 hours in an inert gas atmosphere in a reactor to produce calcined coke; or (b) devolatilization at about 400° C. to about 1,000° C. for about 1 to about 30 minutes in an inert gas atmosphere in a reactor to produce devolatilized coke and stepwise calcining the devolatilized coke at about 1,200° C. to about 1,400° C. for up to about 2 hours in an inert gas atmosphere in the same reactor to produce calcined coke; or (c) stepwise heating at about 250° C. to about 400° C. for about 2 to about 10 hours, then subsequent stepwise calcination at about 400° C. to about 1,000° C. for about 0.5 to about 5 hr to produce devolatilized coke, then calcining said devolatilized coke at about 1,200° C. to about 1,400° C. for about 1 to about 4 hours in an inert gas atmosphere in a batch or continuous reactor to produce calcined coke; or (d) stepwise calcination in a continuous calcining reactor between about 200° C. to about 1,400° C. with up to about 1 hr residence time. Also disclosed are calcined cokes produced by such methods.

It is an advantage of the invention to provide improved methods of producing biomass pyrolysis-derived materials.

It is another advantage of the present invention to provide methods of producing coke from biomass-derived oils having a reduced carbon footprint and lowered concentrations of undesired elements and contaminants.

It is a further advantage of the present invention to provide coke products derived from biorenewable sources having suitable textural characteristics for use in aluminum smelting processes, electrodes for electric arc furnaces, graphite production, and a variety of other industrial applications where petcoke is traditionally used.

It is yet another advantage of the present invention to provide methods of producing coke having desirable anisotropic morphology from bio-oils.

Another advantage of the invention is to provide biorenewable calcined coke having lowered levels of sulfur, vanadium, nickel, other metals, and ash, among other contaminants.

This summary is provided to introduce a selection of concepts in a simplified form that are further described below in the detailed description. This summary is not intended to identify all key or essential features of the claimed subject matter, nor is it intended as an aid in determining the scope of the claimed subject matter.

BRIEF DESCRIPTION OF THE DRAWINGS

FIG. 5A shows XRD spectra of distillate bottoms products, taken at different stages of the calcination process, where FIGS. 5B and 5C are zoomed in at the 43° and 78°, respectively.

FIG. 6A shows at 100× magnification, FIG. 6B shows 2500× magnification, and FIGS. 6C-6D show 5000× magnification.

FIG. 7A shows an example of biorenewable calcined coke cut and sanded for multimeter measurements and FIG. 7B shows application of 6V potential across a piece of biorenewable calcined.

FIG. 9A shows amorphous texture, FIG. 9B shows isotropic texture, FIG. 9C illustrates anisotropic sponge texture, and FIG. 9D shows anisotropic needle texture.

FIG. 15B shows apparent density.

DETAILED DESCRIPTION OF THE INVENTION

Figure 1A:
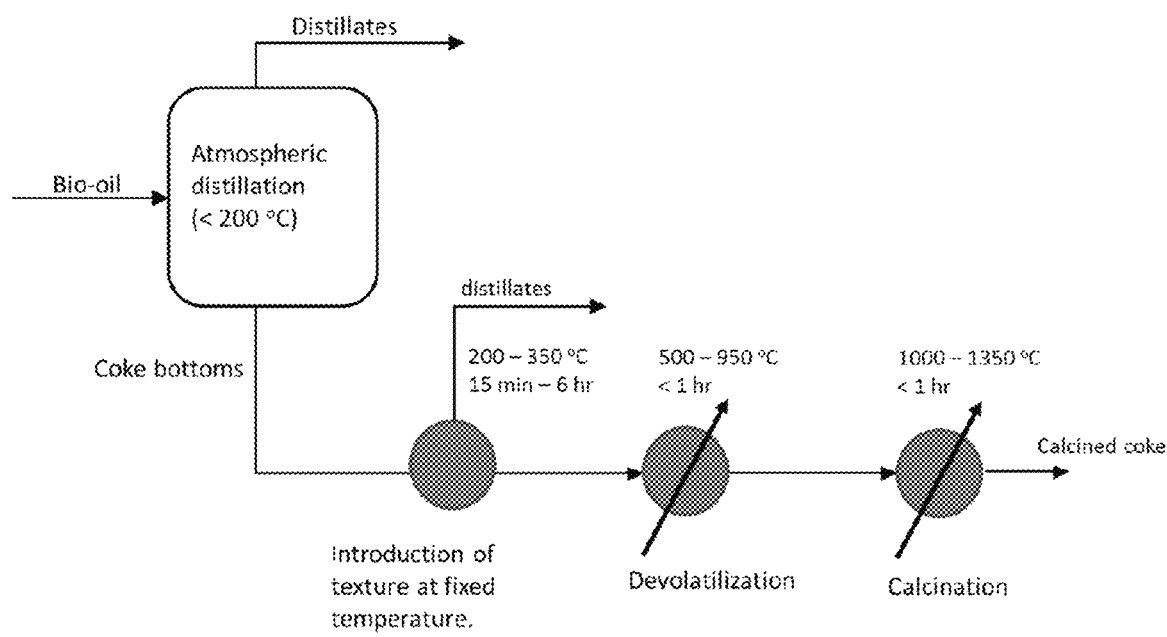
FIGS. 1A and 1B show embodiments of the invention as process diagrams for making calcined coke from biomass-derived oils as described below.

Unless herein defined otherwise, all technical and scientific terms used herein generally have the same meaning as commonly understood by one of ordinary skill in the art to which this invention belongs. The definitions below may or may not be used in capitalized as well as singular or plural form herein and are intended to be used as a guide for one of ordinary skill in the art to make and use the invention and are not intended to limit the scope of the invention. Mention of trade names or commercial products herein is solely for the purpose of providing specific information or examples and does not imply recommendation or endorsement of such products.

A biomass feedstock is defined as any renewable, biological material that can be converted to another form of fuel or energy product. Biomass feedstocks are the animal, plant, and algal materials used to derive fuels. Biomass is defined as living or recently dead organisms and any byproducts of those organisms, plants, or animals. The term is generally understood to exclude coal, oil, and other fossilized remnants of organisms, as well as soils. In the context of biomass energy, the term generally refers to those crops, residues, and other biological materials (plant or animal) that can be used as a substitute for fossil fuels in the production of energy and other products. Biomass feedstocks generally include lignocellulosic materials and animal waste products or animal waste by-products. Biomass feedstocks include the plant and algal materials used to derive fuels like ethanol, butanol, biodiesel, and other hydrocarbon fuels.

Examples of biomass feedstocks include corn starch, sugarcane juice, crop residues such as corn stover and sugarcane bagasse, purpose-grown grass crops, and woody plants. Lignocellulose refers to plant dry matter (biomass), and is often referred to as lignocellulosic biomass. It is composed of carbohydrate polymers (cellulose, hemicellulose), and an aromatic polymer (lignin). These carbohydrate polymers contain different sugar monomers (e.g., six and five carbon sugars) and they are tightly bound to lignin. Lignocellulo sic biomass can be broadly classified into virgin biomass, waste biomass, and energy crops. Virgin biomass includes all naturally occurring terrestrial plants such as trees, bushes, and grasses. Waste biomass is produced as a low value byproduct of various industrial sectors such as agricultural (e.g., corn stover, sugarcane bagasse, straw, etc.), forestry (e.g., saw mill and paper mill discards). Energy crops are crops with high yield of lignocellulosic biomass produced to serve as a raw material for production of second generation biofuel, examples include switch grass (*Panicum virgatum*) and Elephant grass. Animal waste by-products are agricultural by-products originating from livestock facilities. Animal waste products include, for example, animal manure, animal manure solids, poultry litter, etc. Animal manure refers to animal excrement (e.g., solid waste, dung) and urine, optionally mixed with animal bedding, spilled food, spilled water, and/or feathers. Manure includes that from, for example, chickens, turkeys, ducks, geese, swine, sheep, goats, cattle, dairy cows, horses, or rabbits. The animal manure may be solid or liquid or a slurry. Animal manure solids refer to manure solids that are present in a composition, such as poultry litter or an animal waste slurry that contains manure. Solids content refers to the amount of solids present in a composition that remain after water from the liquid is evaporated. There are cases where animal manure solids exist that are not mixed with anything, such as in cattle feed lots. Poultry litter is a mixture of manure, bedding material (such as sawdust, wood shavings, straw, recycled paper, nut hulls, or rice hulls), spilled food and feathers. Poultry litter is the bed of material on which poultry, such as broiler chickens, are raised in commercial poultry rearing facilities. Because the same bed of litter is often used in successive growouts or flocks of poultry, the litter varies over time with the addition of manure to the litter, the addition of bedding or amendments between growouts, and efforts to clean or de-cake the litter between growouts. "De-caking" refers to the process whereby a mechanical device is used to sift the poultry litter between growouts to remove the larger particles, which typically have a higher moisture content than the rest of the litter.

Pyrolysis to obtain biomass-derived oil (bio-oil) can be performed on a bubbling fluidized bed pyrolysis system, for example, see the one previously described by Boateng et al. (Boateng, A. A., et al., Ind. Eng. Chem. Res., 46: 1891-1897 (2007); Boateng, A. A., et al., Energy Fuels, 24: 6624-6632 (2010); U.S. patent application Ser. No. 13/777,020, filed 26 Feb. 2013; Mullen, C. A., et al., Energy and Fuels, 27: 3867-3874 (2013)). Pyrolysis can be conducted at a fluidized bed temperature of between about 400° C. and about 650° C. (e.g., 400° C. to 650° C.) and reaction/residence times from about 0.1 to about 5 seconds (e.g., 0.1 to 5 seconds; preferably about 0.1 to about 1 second (e.g., 0.1 to 1 second)). Control of the temperatures, and feed rate and data collection can be accomplished through use of standard control systems (e.g., Siemens PCS7 control system). In embodiments, a fast pyrolysis process yielding lower-oxygen content bio-oil may also be used.

The disclosed methods include embodiments where biomass-derived oil is produced by a method comprising (or consisting essentially of or consisting of) (1) pyrolyzing biomass feedstock in an inert atmosphere in a reactor to produce bio-oil, bio-char, and non-condensable gases; (2) recycling about 10% to about 99% (e.g., 10% to 99%) of said non-condensable gases to said reactor to produce deoxygenated bio-oil; wherein said method is conducted in the absence of oxygen and wherein said method does not utilize externally added catalysts.

The pyrolysis reactor described above can be modified for operation on, for example, recycled product gas by including a regenerative blower with an inlet port connected to the electrostatic precipitator (ESP) outlet to return ESP tail gases to the fluidized bed plenum upon reheating through an electric heater. A remotely controlled gas outlet valve in the blower inlet line allows for the discharge of the preheated returned gases to maintain a constant system volume. A pressure transmitter in the blower inlet line can be integrated with the control system to modulate the gas outlet valve. The regenerative blower can be sized to provide sufficient flow and head to fluidize the sand bed. The system can be flushed with an inert atmosphere (e.g., nitrogen) during heating to remove system air. A small amount of nitrogen (e.g., <about 0.5 L/min) may be required to flow into the feed drop tube to maintain a positive pressure throughout the system as well as to aid feedstock flow. The amount of non-condensable gases recycled to the reactor may be about 10% to about 99% (e.g., 10% to 99%), preferably about 40% to about 90% (e.g., 40% to 90%), preferably about 60% to about 85% (e.g., 60% to 85%), preferably about 65% to about 80% (e.g., 65% to 80%), preferably about 70% (e.g., 70%) non-condensable gases to said reactor to produce deoxygenated biomass-derived oil. In general, lower oxygen levels in the bio-oil lead to lower oxygen levels in the distillate residues for coking, which leads to higher levels of anisotropy and desirable texture.

In embodiments, the pyrolysis gas (sometimes referred to as tail gas) is recycled through the reactor. This tail gas contains, for example, amounts of CO and $H_2$ which partly deoxygenate the pyrolysis oil (see e.g., Mullen, C. A., et al., "Production of deoxygenated biomass fast pyrolysis oils via product gas recycling," Energy and Fuels, 2013, 27, 3867-3874). Use of in situ produced tail gas is generally much less expensive as compared to using $H_2$ from external sources.

The liquid hydrocarbon-rich oil product from the fast pyrolysis process ("bio-oil," sometimes referred to as pyrolysis oil or biocrude) undergoes atmospheric distillation, followed by vacuum distillation to remove liquid and volatile products. The solid residue may be subject to sequential heat treatment steps to eliminate heteroatoms which introduces crystalline structural domains. The result is a solid that comprises greater than about 96% (e.g., greater than 96%) carbon and possesses characteristics of calcined petroleum coke and/or mesophase pitch but derived primarily from biomass (non-fossil). Calcined petroleum coke is the analogous product that is derived from petroleum (fossil) residues after processing in a refinery delayed coker. The product of this invention, however, is a biorenewable calcined coke which is generally free of sulfur (<500 ppm) and contains lowered amounts of ash (e.g., about 0.2 to about 1.1%), all of which normally exist in significant amounts in petroleum coke. Mineral contaminants such as vanadium and nickel are typically <200 ppm, in contrast to fossil based petroleum coke counterpart. This is significant because these impurities, for example, significantly reduce the efficiency of aluminum smelting when used as soderberg electrodes. They compromise the anodes and/or the strength of carburized steel composites, so the invention makes available superior alternative to what is derived from petroleum in terms of quality.

Disclosed are methods of producing calcined coke from bio-oil from a biomass feedstock. In embodiments, the methods involve (1) subjecting the bio-oil to atmospheric distillation at a temperature from about 50° C. to about 400° C. (e.g., 50° C. to 400° C.), about 700 torr to about 800 torr (e.g., 700 to 800 torr), preferably about 760 torr (e.g., 760 torr) in a batch or continuous distillation unit (distillation apparatus) and/or subsequently to vacuum distillation (e.g., about 100° C. to about 400° C. (100° C. to 400° C.), about 20 torr to about 100 torr (e.g., 20 to 100 torr) in a batch or continuous vacuum distillation unit to produce coke bottoms (vacuum distillation first and atmospheric distillation second is not generally practical), (2) subjecting said coke (i.e., distillation bottoms) to (a) devolatilization at about 400° C. to about 1,000° C. (e.g., 400° C. to 1,000° C., preferably about 900° C. to about 975° C. (e.g., 900° C. to 975° C.), more preferably about 950° C. (e.g., 950° C.)) for about 1 to about 30 minutes (e.g., 1 to 30 minutes), preferably about 5 to about 15 minutes (e.g., 5 to 15 minutes), more preferably about 6 minutes (e.g., 6 minutes) in an inert gas atmosphere (e.g., nitrogen, argon) in a reactor (e.g., furnace or kiln) to produce devolatilized coke, optionally cooling the devolatilized coke, removing the devolatilized coke from the reactor and optionally crushing the devolatilized coke, and calcining said devolatilized coke at about 1,100° C. to about 1,400° C. (e.g., 1,100° C. to 1,400° C., preferably about 1,200° C. to about 1,250° C. (e.g., 1,200° C. to 1,250° C.), more preferably about 1,200° C. (e.g., 1,200° C.) for up to about 2 hours (e.g., up to 2 hours) in an inert gas atmosphere in a reactor to produce calcined coke; or (b) devolatilization at about 400° C. to about 1,000° C. (e.g., 400° C. to 1,000° C.), preferably about 900° C. to about 1,000° C. (e.g., 900° C. to 1,000° C.), more preferably about 950° C. (e.g., 950° C.) for about 1 to about 30 minutes (e.g., 1 to 30 minutes), preferably about 5 to about 10 minutes (e.g., 5 to 10 minutes), more preferably about 6 minutes (e.g., 6 minutes) in an inert gas atmosphere in a reactor to produce devolatilized coke and calcining the devolatilized coke at about 1,100° C. to about 1,400° C. (e.g., 1,100° C. to 1,400° C.), preferably about 1,200° C. to about 1,250° C. (e.g., 1,200° C. to 1,250° C.), more preferably about 1,200° C. (e.g., 1,200° C.) for up to about 2 hours (e.g., up to 2 hours) in an inert atmosphere in the same reactor to produce calcined coke; or (c) heating at about 250° C. to about 400° C. (e.g., 250° C. to 400° C.), preferably about 300° C. (e.g., 300° C.) for about 2 to about 10 hours (e.g., 2 to 10 hours), preferably about 3 hours (e.g., 3 hours), then subsequent devolatilization at about 400° C. to about 1,000° C. (e.g., 400° C. to 1,000° C.), preferably at about 550° C. (e.g., 550° C.) for about 0.5 to about 5 hr (e.g., 0.5 to 5 hours), preferably about 1 hr (e.g., 1 hr)) to produce devolatilized coke, then calcining said devolatilized coke at about 1,200° C. to about 1,400° C. (e.g., 1,200° C. to 1,400° C.), preferably at about 1,200° C. (e.g., 1,200° C.) for up to about 2 hours (e.g., up to 2 hours), preferably about 1 hr (e.g., 1 hr) in an inert gas atmosphere to produce calcined coke; or (d) calcination in a continuous calcining reactor between about 200° C. to about 1,400° C. (e.g., 200° C. to 1,400° C.), preferably about 500° C. to about 1,200° C. (e.g., 500° C. to 1,200° C.) with up to about 1.5 hr (e.g., up to 1.5 hr) residence time, preferably about 500° C. (e.g., 500° C.) for about 30 minutes (e.g., 30 minutes), then about 800° C. (e.g., 800° C.) for about 40 minutes (e.g., 40 minutes), then about 1,200° C. (e.g., 1,200° C.) for about 20 minutes (e.g., 20 minutes). Also disclosed are calcined cokes produced by such methods. See U.S. Patent Application Publication 2016/0177208.

It is envisaged that biomass oil would be transformed in conventional refineries for a more economical industrial adoption of the disclosed invention. Upon coking, the biomass feedstock passes through liquid phase making development of the desired anisotropic texture possible. However, the temperature range in which the viscosity of the reaction mixture is sufficiently low to allow alignment to an anisotropic texture depends on the oxygen content. Due to interactions between the oxygen-groups, this range is much smaller for high-O oil than for low-O oil (see below). Consequently, coke anisotropy increases with decreasing oxygen content of the corresponding biomass feedstock (see e.g., Monthioux, M., et al., "Heavy petroleum products: microtexture and ability to graphitize," Carbon, 1982, 20, 167-176). An important factor in determining whether the corresponding coke is suitable for certain industrial uses (e.g., anodes for aluminium smelting, electrodes for electric arc furnaces, graphite production, steel carburization, and a variety of other industrial applications) for the biomass-derived oil used in the present invention is oxygen content.

In embodiments, the methods of producing calcined coke from bio-oil from a biomass feedstock include surprisingly simplified methods to arrive at the desired anisotropic calcined product. The invention discussed herein minimizes or eliminates certain quality issues surrounding calcined coke and, for example, offers unique advantages in the following ways: (i) sulfur is eliminated to trace levels below 500 ppm (vs. >2-3%), (ii) vanadium and nickel are absent completely in most cases (vs. >300 ppm), and (iii) total ash/metal content is comparable and/or less than petroleum coke, depending on the biomass used for pyrolysis. The invention is additionally biorenewable (vs. originating from fossil fuel) and may also result in increased revenues by elimination of a desulfurization step.

During the transformation of biomass to char, the material generally remains solid. It does not pass through a liquid phase, required for the alignment of the developing carbon layers to a "graphite-like", anisotropic texture (see e.g., Marsh, H., et al., "Semicokes from pitch pyrolysis: mechanisms and kinetics," Carbon, 1999, 37, 363-390). Therefore, when the material remains in solid state only limited alignment is typically possible leading to amorphous or isotropic chars, which is undesired in anodes and other industrial uses. Anodes made with an amorphous or isotropic filler have a high coefficient of thermal expansion (CTE), making them susceptible to thermal shock cracking (see e.g., Neyrey, K., et al., "A Tool for Predicting Anode Performance of Non-Traditional Calcined Cokes," Light Metals, 2005, 607-612 and Schneider, J. P. & Coste, B., "Thermal Shock of Anodes: Influence of Raw Materials and Manufacturing Parameters," Light Metals, 1993, 611-619). Nearly all inorganic material (including alkali and earth alkali metals) present in the biomass reports to the char. As long as during pyrolysis the transfer of such solids containing inorganic compounds to the oils is avoided, the concentration of alkali and earth alkali metals in the corresponding coke remains low.

Also disclosed are methods of producing calcined coke from a bio-oil derived from a biomass feedstock as described herein. In embodiments, the bio-oil is made using a fast pyrolysis tail-gas reactive process (see e.g., U.S. Pat. No. 9,434,885) and can also be made or obtained by other means known in the art. In embodiments, the method includes subjecting the bio-oil to atmospheric distillation (as shown in FIG. 1A) in a batch or continuous distillation unit and/or subsequently to vacuum distillation in a batch or continuous vacuum distillation unit to produce a bio-oil distillation residue. In preferred embodiment, the atmospheric distillation occurs at temperatures less than about 200° C., or in the range from about 100° C. to about 150° C., or from about 100° C. to 200° C. and in the absence of vacuum distillation. The bio-oil distillation residue is then subjected to a temperature from about 200° C. to about 350° C. for a time sufficient for carbonaceous domains to align and crystallize. In embodiments, the temperature is raised at a rate from about 5° C./min to about 50° C./min, or from about 10° C./min to about 40° C./min, or from about 15° C./min to about 30° C./min, or from about 16° C./min to about 20° C./min until a temperature of about 200° C., or about 250° C., or about 275° C., or about 300° C., or about 325° C., or about 350° C. is attained and held for at least about 20 minutes, or at least about 30 minutes, or from about 5 min to about 45 min, or from about 10 min to about 35 min, or about 15 to about 30 min, or about 20 min to about 30 min at each temperature. While about 15 to about 30 (e.g., 15 to 30) minutes is often a preferred time to produce desired isotropy, longer times may influence the texture and provide anisotropy. It should be appreciated the needed time varies directly with the starting oxygen content in the oil and/or distillate bottoms. Generally, biomass-derived oil with oxygen content less than about 17 wt % (dry basis) is required. In embodiments, the method includes optionally introducing additional texture (e.g. further densifying the carbonaceous domains) at a fixed temperature or variable temperature at up to about 400° C., or from about 150° C. to about 400° C., or from about 200° C. to about 350° C. for a time ranging from about 5 min to about 10 hours, or from about 5 min to about 8 hours, or from about 5 min to about 6 hours, or from about 10 min to about 6 hours. It should be appreciated that a skilled artisan would determine when the produce has undergone sufficient texturization and be considered suitable for an anisotropic coke product. In embodiments, the method optionally includes a step of devolatilizing the coke product as also described above at about 400° C. to about 1,000° C. (e.g., 400° C. to 1,000° C.), or about 500° C. to about 950° C. (e.g., 500° C. to 950° C.), or from about 900° C. to about 975° C. (e.g., 900° C. to 975° C.), or from about 950° C. (e.g., 950° C.)) for up to about 1 hour, or about 1 minute to about 60 minutes (e.g., 1 to 60 minutes), or from about 5 minutes to about 60 minutes (e.g., 5 to 60 minutes), or from about 10 minutes to about 60 minutes (e.g., 10 to 60 minutes), or from about 15 to about 60 minutes (e.g., 15 to 60 minutes) in, for example, an inert gas atmosphere (e.g., nitrogen, argon) in a reactor (e.g., furnace or kiln) to produce devolatilized coke that is calcination-ready. The method further includes calcining the calcination-ready coke product to produce an anisotropic coke product. In embodiments, calcining the calcination-ready coke product to produce an anisotropic coke product includes heating the calcination-ready coke product over a gradual period of time (e.g., 30 min, 60 min, 150 min, 180 min) to a temperature range from about 900° C. to about 1,500° C., or from about 950° C. to about 1,400° C., or from about 1,000° C. to about 1,350° C. The temperature ramping rate would be determined by a skilled artisan and may vary depending on the type of furnace used (e.g., static furnace, rotating tube furnace, etc.). The temperature and time profiles would be adjusted depending on the type of biomass. Continuous calcination methods may also be utilized.

In embodiments, the disclosed methods of producing calcined coke from a bio-oil derived from a biomass feedstock includes a plurality of different biomass feedstocks. In embodiments, a plurality of different bio-oils are combined to form the calcined coke product. In embodiments, the disclosed coke products are combined with other coke products including coke derived from petroleum (i.e., petcoke). In embodiments, bio-oils are co-processed with conventional oils derived from other biorenewable sources and/or from fossil sources. In embodiments, any combination of starting materials for oil production may be combined to arrive at the coke product having the desired structural and other characteristics. In embodiments, any combination of coke products (e.g., biocokes and petcokes) either before or after calcination may be combined to arrive at the final coke product having the desired structural and other characteristics.

In view of this disclosure, there is described in part the following. The methods disclosed herein, where said calcined coke contains or comprises about 96 to about 100% carbon (e.g., 96-100%); at least about 96% carbon (e.g., at least 96%); at least about 97% carbon (e.g., at least 97%); at least about 98% carbon (e.g., at least 98%); about 0 to about 1.5 wt % nitrogen (e.g., 0 to 1.5 wt %); less than about 1.5 wt % nitrogen (e.g., less than 1.5 wt %); about 1 wt % nitrogen (e.g., 1 wt %); about 0.5 wt % nitrogen (e.g., 0.5 wt %); about 0 to about 3 wt % oxygen (e.g., 0 to 3 wt %); less than about 2 wt % oxygen (e.g., less than 2 wt %); less than about 1.5 wt % oxygen (e.g., less than 1.5 wt %); less than about 1 wt % oxygen (e.g., less than 1 wt %); about 0.5 wt % oxygen (e.g., 0.5 wt %); about 0 to about 2,000 ppm iron (e.g., 0 to 2,000 ppm); less than about 1,700 ppm iron (e.g., less than 1,700 ppm); less than about 1,500 ppm iron (e.g., less than 1,500 ppm); about 200 to about 500 ppm sulfur (e.g., 200 to 500 ppm); less than about 500 ppm sulfur (e.g., less than 500 ppm); less than about 300 ppm sulfur (e.g., less than 300 ppm); about 0 to about 200 ppm vanadium (e.g., 0 to 200 ppm); less than about 150 ppm vanadium (e.g., less than 150 ppm); about 0 to about 300 ppm nickel (e.g., 0 to 300 ppm); less than about 280 ppm nickel (e.g., less than 280 ppm); about 0 to about 100 ppm sodium (e.g., 0 to 100 ppm); less than about 10 ppm sodium (e.g., less than 10 ppm); about 100 to about 500 ppm calcium (e.g., 100 to 500 ppm); less than about 400 ppm calcium (e.g., less than 400 ppm); less than about 250 ppm calcium (e.g., less than 250 ppm); about 0.02 to about 1.1% ash (e.g., 0.02 to 1.1%); less than about 1.1% ash (e.g., less than 1.1%); less than about 1% ash (e.g., less than 1%); less than about 0.5% ash (e.g., less than 0.5%); less than about 0.4% ash (e.g., less than 0.4%); and/or (as applicable) less than about 0.2% ash (e.g., less than 0.2%). Further, the methods disclosed herein, where said calcined coke has less than about 2 Ω-mm electrical resistivity (e.g., less than 2 Ω-mm); about 1 to about 2 Ω-mm electrical resistivity (e.g., 1 to 2 Ω-mm); HHV of about 30 to 40 MJ/kg); and/or (as applicable) HHV of about 36 MJ/kg (e.g., 36 MJ/kg); HHV of about 33.3 MJ/kg (e.g., 33.3 MJ/kg). The methods disclosed herein, where said calcined coke contains or comprises about 0 to about 4 wt % hydrogen (e.g., 0 to 4 wt %); less than about 4 wt % hydrogen (e.g., less than 4 wt %); or less than about 1 wt % hydrogen (e.g., less than 1 wt %). The methods herein, where said biomass feedstock is selected from the group consisting of lignocellulo sic biomass, animal waste products, and mixtures thereof.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement. The following examples are intended only to further illustrate the invention and are not intended in any way to limit the scope of the invention as defined by the claims.

Example 1

Fast pyrolysis of biomass: Prior to fast-pyrolysis experiments, all feedstocks were ground and dried. Switchgrass (SwG) feedstock was provided by the McDonnell Farm (East Greenville, Pa.), *Eucalyptus benthamii* (Eucal) by Embrapa Forestry (Candoi, Parana, Brazil), and guayule bagasse (Guay) by Yulex (Chandler, Ariz.). Fast-pyrolysis of feedstock was carried out in the USDA fluidized bed fast pyrolysis system, as described previously (Mullen, C. A., et al., Energy Fuels, 27: 387-3874 (2013); U.S. patent application Ser. No. 13/777,020 filed 26 Feb. 2013). Briefly, 2 kg/hr of feedstock is fed through a fluidized sand bed reactor under 500° C., $N_2$ (FIG. 1a). The resulting vapors then pass through a cyclone which separates out char particulates. Liquid phases are then condensed from the vapor by four condensers in series. Oil precipitates from the non-condensable gases (NCGs) by two electrostatic precipitators (ESPs) in series. All experiments used the oil obtained from the ESPs. For tail-gas recycle experiments, a fraction of the non-condensable gas stream was mixed with the $N_2$ stream and recycled into the fluidized bed, using a preheater and gas blower. The pyrolysis system recycled the tail gas generally in the range of about 50-70%. Unless specified otherwise, biomass samples underwent the TGRP process.

Example 2

Bio-oil distillation: Bio-oil samples were distilled using either a fractionating column or a short-path distilling head (Elkasabi, Y., et al., ACS Sustainable Chem. Eng., p. 10.1021/sc5002879 (2014)). Briefly, 20, 50, or 100 g of bio-oil was heated in a round-bottom flask connected to a distillation apparatus. Vapors were condensed and collected until the bottoms temperature reached 350° C. Then vacuum was applied, and more vapors were condensed and collected. After removing the vacuum and turning off the heating mantle, the round-bottom flask was allowed to cool. The hard glassy bottoms residue was chipped, scraped, and collected from the flask and crushed into a granular powder with a mortar and pestle.

Example 3

Devolatilization and calcination of distillate bottoms: For devolatilization, 1 to 5 g of each distillate bottoms sample was placed in a high-temperature crucible and then the crucible placed in a static muffle furnace. The oven with crucibles was purged of air with nitrogen before placing lids on crucibles. With continuous nitrogen flow, the oven temperature was gradually raised to 950° C. over a period of approximately 1 hr, then held at that temperature for 6 minutes before the crucibles were removed and cooled. Devolatilized products were crushed into a powder for further analysis. For calcination, the same procedure was followed for either devolatilized bottoms or distillate bottoms, except that the temperature was gradually raised to a temperature of 1,200° C. over a period of 3 hr (see FIG. 1B). The crucibles were then held at 1,200° C. for 1 hr, then the temperature was very gradually lowered to 400° C. before removing the crucibles from the oven in order to prevent crucible fracture. For one-step calcination, distillate bottoms underwent devolatilization and calcination in series without any intermediate cooling step.

Example 4

Characterization: Powder X-ray Diffraction (XRD) was performed on bottoms samples (as-is, devolatilized, calcined) using a Rigaku high sensitive D/teX Ultra with a scan rate of 6 degrees per minute. Elemental analysis (CHN) by combustion, as well as sulfur analysis by titration, was carried out by Robertson Microlit Laboratories (Ledgewood, N.J.). Oxygen content was determined by difference. FTIR spectra of solid samples were obtained using a Nicolet Nexus 670 FTIR spectrometer (Madison, Wis.) with a Smart Orbit diamond attenuated total reflection (ATR) accessory, DTGS KBr detector splitter, and KBr splitter. Scanning electron microscopy images were taken using a Quanta 200 FEG Environmental Scanning Electron Microscope. Higher heating values of combustion were determined for distillate bottoms samples using a Leco AC600 bomb calorimeter. Ash content was determined by heating the sample in a crucible to 750-850° C. (ambient air) overnight. The mass remaining in the crucible was weighed, and this weight was normalized by the starting mass to calculate the % ash. Electrical conductivity measurements were performed using a CE Compass 305D variable DC power supply and a Cen-Tech P37772 multimeter. Calcined samples were cut into rectangles from a solid sample, and a colloidal silver paint was applied to each end of the rectangular sample. Cut samples were measured for electrical resistance across the length of the sample using a multimeter. Resistivity values were calculated based upon measurements of fixed, longitudinally-shaped samples.

Surface area measurements and temperature programmed oxidations were performed on a Quantachrome ASiQ with an attached Pfeiffer Vacuum PrismaPlus mass spectrometer (Quantachrome Instruments, Boynton Beach, Fla.). Prior to surface area measurements, samples were outgassed for 12 h at 200° C. Surface areas were then determined using the BET method over the pressure range of $0.025<P/P_0<0.3$. In a typical TPO analysis, about 12 mg of sample were placed in a sample tube sandwiched between packings of quartz wool and dried and degassed at 120° C. under vacuum for 20 min. Gas flow was then started using a mixture of 5% $O_2$ in helium (ILMO gas, Jacksonville, Ill.) set at a flow rate of 40 mL/min and the cell purged for 20 min prior to the start of the measurement. Under this gas flow and at this starting temperature, the sample was heated at 10° C./min to 1,050° C. The mass spectrometer outputs representing the following m/e were recorded: 18 ($H_2O$), 28 (CO), 32 ($O_2$), and 44 ($CO_2$). X-ray fluorescence (XRF) was performed within a focused ion beam SEM (FEI Strata DB235) using an integrated x-ray fluorescence analyzer with separate x-ray source for trace elemental analysis.

Results and Discussion.

Coke Preparation Steps: Although all coke samples originated from bio-oils of varying feedstock origins, the process was designed for upgrading distillate bottoms such that all products converge towards similar compositions regardless of feedstock origins. The main reason was to remove feedstock dependence from an eventual biorefinery, which would enhance technology transfer from location to location. Calcined coke consists of >96% graphitized carbon domains, so all calcined bottoms products should theoretically be identical. After performing atmospheric and vacuum distillations, a semi-liquid distillate with a jet black residue remained in the flask. Under vacuum, the residue resembled a molten viscous tar. When raised to atmospheric pressure and cooled quickly, the tar solidified into a glassy black solid. Chipping and grinding the solid was the only practical way of utilizing it for post-processing. For industrial purposes, a continuous distillation process would handle the vacuum distillate bottoms under raised temperature, in a manner very analogous to a traditional petroleum refinery.

Figure 1B:
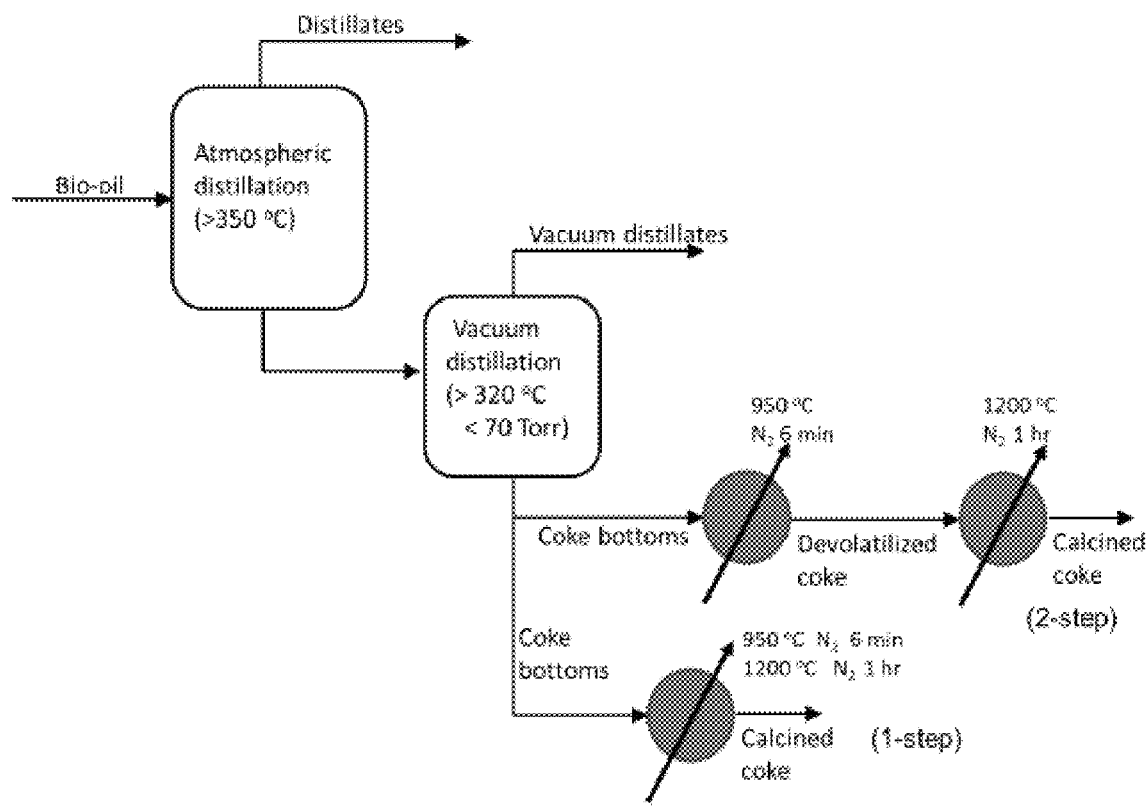

Industrially, calcined coke is manufactured by feeding the coke emanating from the petroleum residue or delayed coker (termed "green coke") into a rotary kiln. The kiln gradually heats the green coke under inert atmosphere through multiple temperature zones, each of which serves a different purpose beginning from volatile evolution to structural adjustments through grain growth. For our laboratory batch experiments, we divided the heat treatment steps into multiple stages in order to segregate the phases of coke transformation. As seen in FIG. 1B, the first step consisted of removing any volatiles, such that only fixed carbon remained behind. Since fixed carbon consists of very high molecular weight polyaromatic hydrocarbons (PAHs), the devolatilization step serves the dual purpose of increasing the carbon percentage as well as removal of volatile compounds from fixed carbon. A second step (calcination) was applied to the devolatilized bottoms, which served the purposes of (1) eliminating any heteroatoms, (2) rearranging free carbon chains into polyaromatic domains resembling graphite, and (3) increasing the size of the polyaromatic carbon domains. A one-step calcination process was also investigated, wherein the calcination occurs immediately after the devolatilization without removing the devolatilized sample from the furnace. The devolatilization expands the fixed carbon and stretches it out to thinner strands for calcination, so we anticipated that the one-step calcination will have a fundamentally different effect on the coke quality and/or structure. This one-step investigation was necessary since it mimics temperature grading through a rotary kiln.

Elemental Analysis: Table 1 presents the elemental and proximate analysis of the distillate bottoms at different processing stages. Comparisons can be made with typical values for petroleum coke (Table 2). Distillate bottoms exhibited evidence of feedstock effects since they contain remnants of biomacromolecules; for example, guayule contained higher concentrations of nitrogen. Overall, the bottoms products surprisingly exhibited properties which made them useful as-is. Via bomb calorimetry, the bottoms surprisingly possessed heating values between 32.6 and 36.4 MJ/kg, a significantly higher range than that of traditional petroleum coke or coal (29.8 and 25.2 MJ/kg, respectively) (Andrews. A. & R. K. Lattanzio, "Petroleum Coke: Industry and Environmental Issues," Congressional Research Service, 2013). Combined with the tail-gas from the TGRP process (HHV=12.4 MJ/kg) (Mullen, C. A., et al., Energy Fuels, 27: 387-3874 (2013)), distillate bottoms can still serve as fuel for the endothermic pyrolysis reaction to reduce heat demand for a pyrolysis biorefinery.

TABLE 1

Chemical and physical properties of petroleum-derived coke products and pyrolysis-derived biochar

|  | Petroleum coke | | Biochar |
| --- | --- | --- | --- |
|  | (Raw) | (Calcined) | (SwG) |
| C | 90 | >96 | 63.1 |
| H | <4 | <0.1 | 3.7 |
| N | 2-3 | 1-1.5 | 0.78 |
| O | 1-1.5 | 0 | 5.6 |
| S | 3 | 3 | — |
| HHV (MJ/kg) | 31.3 | — | 20.1 |
| % ash | <0.4 | <0.4 | 26.9 |
| % volatiles | 10-12 | <0.4 | |

TABLE 2

Characterization of distillate bottoms products at various stages of the calcination process.
(SwG = switchgrass, Eucal = *eucalyptus*, Guay = guayule, all using TGRP process. SwG-reg = switchgrass using traditional pyrolysis)

|   | Bottoms | | | | Devolatilized | | | Calcined | | | |
|---|---|---|---|---|---|---|---|---|---|---|---|
|   | SwG | Eucal | Guay | SwG-reg | SwG | Eucal | Guay | SwG | Eucal | Guay | SwG-reg |
| C | 86.82 | 84.32 | 80.09 | 71.09 | 93.77 | 95.07 | 93.08 | 96.06 | 97.78 | 97.26 | 93.06 |
| H | 4.9 | 5.4 | 7.19 | 4.3 | 0.72 | 0.32 | 0.82 | 0.89 | 0.53 | 0.31 | 0.18 |
| N | 1.31 | 0.41 | 2.9 | 1.05 | 1.32 | 0.77 | 2.83 | 0.57 | 0.34 | 1.04 | 0.52 |
| O | 6.97 | 9.87 | 9.82 | 23.56 | 4.19 | 3.84 | 3.27 | 2.48 | 1.35 | 1.39 | 6.24 |
| S |   |   |   |   | <0.05 | <0.05 | <0.05 |   |   |   |   |
| HHV (MJ/kg) | 36.4 | 34.4 | 32.6 | 29.0 | 32.9 | 34.5 | 34.0 | 33.3 | 33.4 | 33.4 | 33.3 |
| % ash |   |   |   |   |   |   |   | 0.7 | 0.2 | 1.1 | 0.3 |

The surprisingly low ash content and absence of sulfur enable distillate bottoms to be used for both fuel and higher quality cokes if the bottoms calcination step is optimized with respect to material properties. Devolatilization of the distillate bottoms produced a lustrous black solid which is usually indicative of greater structural order. Losses due to volatiles comprised at least 38% to upwards of 60% of the distillate bottoms. While these percentages are considered relatively high for asphalting applications, a partial devolatilization step is conceivable, which would remove a portion of the volatiles without further heating. Devolatilization surprisingly removed nearly all of the residual hydrogen, oxygen was reduced to less than half the original content, and nitrogen remained unchanged. It was only during high-temperature calcination that the nitrogen content surprisingly fell significantly. Most importantly, the carbon percentages surprisingly increased for both devolatilization and calcination steps. The renewable calcined coke resulting from this process surprisingly had properties similar to calcined petroleum coke, but in addition had two properties which surprisingly render it superior. Sulfur was surprisingly present in only trace quantities (below 500 ppm), and for specific feedstocks the ash/metals content surprisingly amounted to less than 0.7%, with low concentrations of specifically problematic metals such as vanadium, nickel, sodium, potassium, and calcium. Very low sulfur levels strongly benefit aluminum smelting anodes, graphite, and steel metallurgy.

In aluminum smelting, sulfur reduces the reactivity of carbon anodes and produces toxic $SO_2$ and COS gases. To make steel, coke used during the recarburizing step should be as low in sulfur as possible since its presence causes brittleness in the final product. For graphitization of calcined coke, both sulfur and nitrogen induce "puffing" which ruins the structural ordering (Ellis, P. J. 7 & C. A. Paul, 'Tutorial: Petroleum Coke Calcining and Uses of Calcined Petroleum Coke," IN AIChE 2000 Spring National Meeting, Third International Conference on Refining Processes, Session T9005, Atlanta, Ga., 2000). Although the nitrogen and oxygen levels could still be reduced further, these calcined bottoms products surprisingly resulted from only 1 hr of calcination at 1,200° C., whereas smaller levels of heteroatoms (e.g., nitrogen, hydrogen, oxygen) can come about from higher temperatures and longer reaction times. Nevertheless, the results also surprisingly illustrated the greater efficiency in process time and temperature for calcining distillate bottoms as compared to petroleum coke. Elemental analysis (EA) results from the one-step procedure surprisingly produced similar results, with no indication of improved carbon percentages. Yields of devolatilized bottoms ranged from 50 to 65%, depending on the starting volatiles content. Calcination of devolatilized bottoms consistently resulted in an 85-87% yield across all bottoms samples, which surprisingly indicated the uniformity of the process into a defined product. Furthermore, HHV values for calcined products surprisingly all measured to be nearly identical values (around 33.3 MJ/kg) which, as noted above, was significantly higher range than that of coal. Since HHV is directly related to atomic composition, the identical HHV values surprisingly demonstrated the convergence of all bottoms samples towards a standardized end product (see also Table 8 below).

Metallic impurities can alter the application and/or final end-use properties for calcined coke. For aluminum smelting anodes, the electrolysis introduces the metal impurities into the aluminum product and affects the reduction efficiency (Hardin, E. E. & R. E. Gehlbach, "Calcined petroleum coke for the aluminum industry," Great Lakes Carbon Corporation—Information Booklet, 1992); therefore aluminum smelters require low ash and/or metals content. We employed x-ray fluorescence to elucidate the amount and types of metal impurities that make up the ash. In general, most metal concentrations surprisingly fell close to or within limits typically found for petroleum coke. Vanadium and nickel are two specific metals which are heavily undesired in the petrochemical and anode industries, due to catalyst poisoning and air reactivity, respectively (Mandal, P. C., et al., J. Japan Petrol. Inst., 1: 18-28 (2014)). Their levels in calcined bottoms surprisingly remained mostly absent or at very low concentrations. Horse litter contained slightly higher levels of P, Na, and Ca, which tend to cause issues with anode oxidation and/or efficiency. Hardwoods generally contained less ash than horse litter and/or guayule bagasse.

TABLE 3

Metals content of calcined distillate bottoms samples, as determined by XRF of ash. Values are compared with general specifications for petroleum coke.

|   | Impurity | Typical spec. (max.) | hardwood | horse litter |
|---|---|---|---|---|
| % | S | 3 | 0.05 | 0.05 |
|   | O |   | 2 | 1.4 |
|   | V | 350 | 0 | 0 |
| ppm | Ni | 250 | 11 | 8 |
|   | Mn | 10 | 6 | 8 |
|   | Ti | 20 | 8 | 16 |
|   | Zn | 10 | 22 | 2 |

TABLE 3-continued

Metals content of calcined distillate bottoms samples, as determined by XRF of ash. Values are compared with general specifications for petroleum coke.

| Impurity | Typical spec. (max.) | hardwood | horse litter |
|---|---|---|---|
| Si | 250 | 239 | >358[a] |
| Ca | 200 | 166 | 240 |
| Na | 150 | 224 | 426 |
| K |  | >211[a] | nm |
| P | 10 | 9 | >83[a] |

[a]actual value is beyond the measurable limit for method

Figure 2:
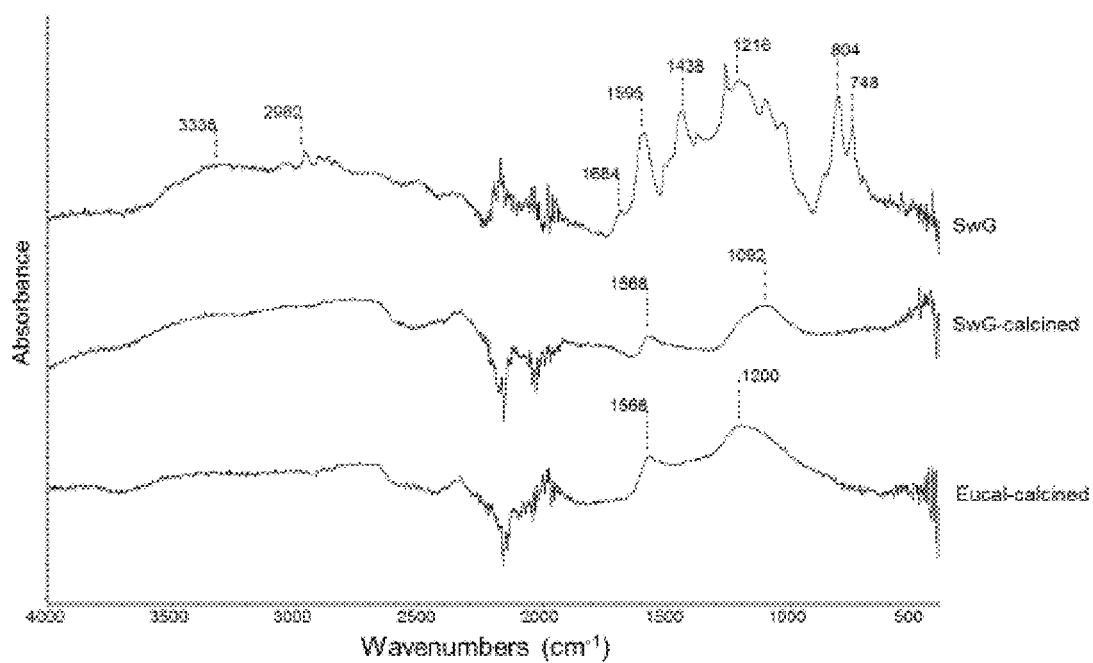
FIG. 2 shows FTIR spectra of distillate bottoms, before and after calcination.

FTIR Spectroscopy: Due to the very heavy and conductive nature of the calcined coke molecules, techniques for characterization were limited. Calcined coke (in general, and the product) is insoluble in every common solvent. FTIR was used to assess the presence of functional groups and chemical bonds in fresh distillate bottoms, as well as the predominant chemical bonds present in the structured calcined bottoms. While calcined and/or graphitized cokes have been characterized by the complementary Raman spectroscopy method, recent studies have revealed useful information with FTIR as well (Zhao, J., et al., Carbon, 47: 744-751 (2009); Garcia, A. B., et al., Carbon, 47: 2563-2570 (2009); Sarkar, A., et al., Fuel, 117: 598-607 (2014)). FIG. 2 shows FTIR spectra for switchgrass distillate bottoms (as-is, calcined) and *eucalyptus* distillate bottoms (calcined). From the switchgrass distillate bottoms spectrum, oxygenated species existed as alcohol groups (3336 $cm^{-1}$), carbonyls (1684 $cm^{-1}$), and C—O linkages (1300-1000 $cm^{-1}$); other functional groups included the C—H stretch (2962 $cm^{-1}$) and aromatic C—C (1595 and 1438 $cm^{-1}$). In contrast, the calcined samples studied always showed only two peaks: a singular aromatic C—C peak (1568 $cm^{-1}$) and a C—O stretch (1092-1200 $cm^{-1}$). Although all samples contained aromatic C—C bonds, the number of C—C peaks were surprisingly reduced to a single broad band in calcined samples, which reflected two phenomena: (1) homogenization of chemical composition and structure, and (2) increased restriction of bond vibrations due to structural order. While the oxygen content was relatively small in calcined samples, the C—O peak at 1092 and/or 1200 $cm^{-1}$ usually appeared with strong intensity, compared with peaks of other functional groups. Hence, the C—C and C—O peaks appeared to be of similar peak intensity. In addition, the two FTIR bands corresponded well with the Raman shift values reported in literature for calcined petroleum cokes (Zhao, J., et al., Carbon, 47: 744-751 (2009)).

Figure 3A:
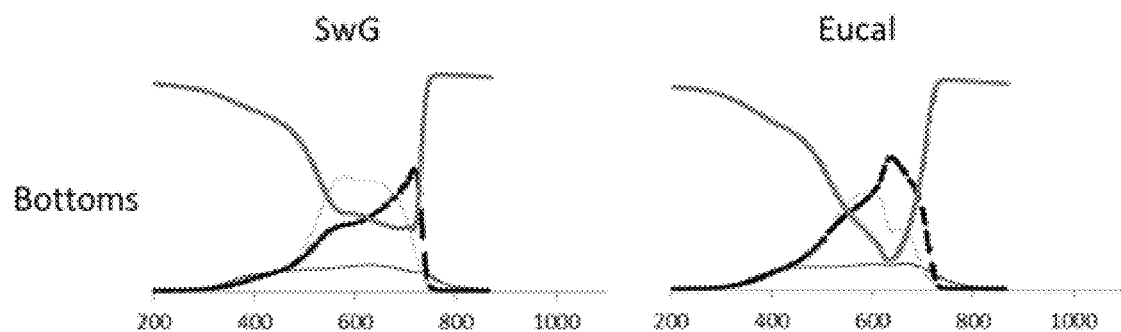
FIGS. 3A to 3C show TPO plots of distillate bottoms for switchgrass and *eucalyptus*, taken at various stages of the calcination process.
Figure 3B:
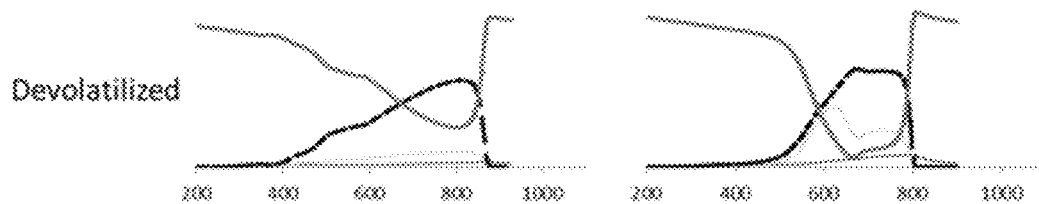
Figure 3C:
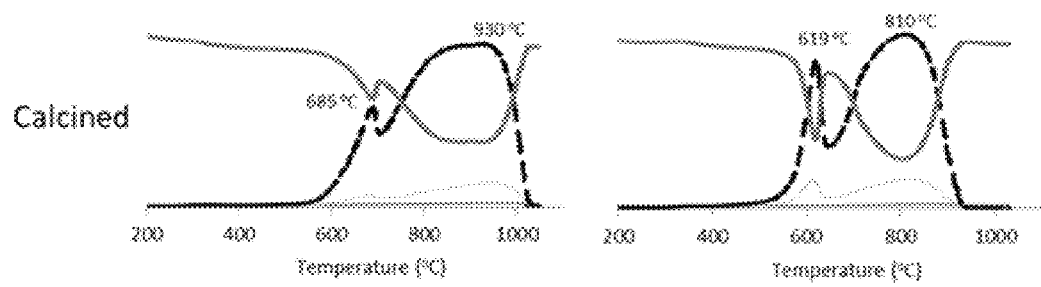

Temperature Programmed Oxidation (TPO): Temperature programmed oxidation is a method for observing oxidation trends and products as they relate to the structural and compositional properties. Oxidation temperatures of carbonaceous solids are directly proportional to their degree of structural order (Garcia, A. B., et al., Carbon, 47: 2563-2570 (2009); Oliveira, H. A., et al., J. Braz. Chem. Soc., 23: 868-879 (2012); Chen, K., et al., Fuel, 113: 274-279 (2013)). TPO was used to evaluate oxidation resistance of coke samples by observing the oxidation products produced. Each sample was reacted under 5% oxygen in helium in order to observe evolution of water and carbon oxides. FIG. 3 displays the TPO profiles for bottoms from two different bio-oils throughout the calcination process. For all bottoms samples, TPO profiles revealed a gradual reduction in the amount of water produced until the calcined samples surprisingly produced no water, indicative of the high purity of carbon in calcined coke. Temperatures for peak oxygen consumption and ignition temperature (i.e., onset of oxygen consumption) increased for both devolatilization and calcination steps, indicating the role each step contributed towards structural improvement of distillate bottoms. While peak temperatures may exhibit slight variations due to differences in sample size, the ignition temperature was not affected, and the ignition temperatures confirmed the trends found with the peak oxygen consumption temperatures.

Generally speaking, combustion of carbon into CO indicates a degree of resistance against the complete oxidation into $CO_2$ (and hence so does the $CO/CO_2$ ratio). As-is, the distillate bottoms surprisingly exhibited significantly greater levels of CO production relative to $CO_2$ as compared with typical fast-pyrolysis biochar (Jackson, M. A., et al., BioResources, 8: 5461-5474 (2013)). Since biochar (the side product from fast pyrolysis) is heavily loaded with metals compared with distillate bottoms, biochar carbon morphology is amorphous, as indicated by its low temperature of oxidation (Chen, K., et al., Fuel, 113: 274-279 (2013)). The volatiles content of distillate bottoms played a role in their higher heating values by facilitating the combustion of the higher molecular weight carbon. This was evidenced by the significant increase in TPO combustion temperature in going from "as-is" to devolatilized bottoms. Although the decrease in elemental oxygen content was much greater for the devolatilization step, the drop in $CO/CO_2$ ratio was much greater for the calcination step. This disparity indicated that the drop in $CO/CO_2$ ratio was likely due to the structural reordering rather than due to a loss in reactive oxygen. Another clear indication of the structural homogenization of calcined coke was the similarity of the CO and $CO_2$ curves. In the bottoms, the CO and $CO_2$ profiles appeared to evolve independently whereas the two gases evolved in parallel in the devolatilized and calcined samples.

Figure 4:
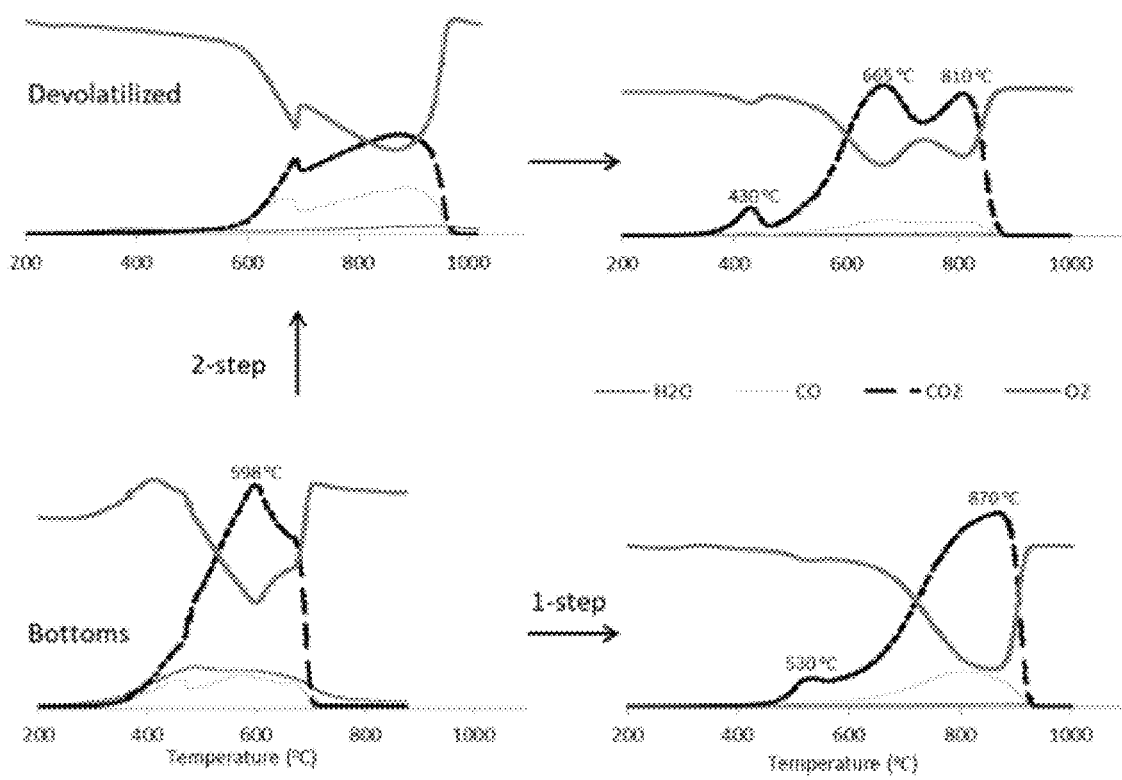
FIG. 4 shows TPO plots of guayule distillate bottoms, taken for both the two-step and one-step calcination processes.

With regards to one-step calcination, FIG. 4 displays the TPO of guayule distillate bottoms through the calcination process in comparison with a two-step calcination. While it appeared that the devolatilization step significantly improved the structural ordering via the higher peak temperature, the subsequent calcination step reduced the peak combustion temperature to 810° C. while simultaneously segregating the coke into three specific domains. On the other hand, the one-step procedure surprisingly improved the morphological uniformity by increasing the peak temperature and reducing it to a single curve, with the exception of the small peak at 530° C.

Figure 5A:
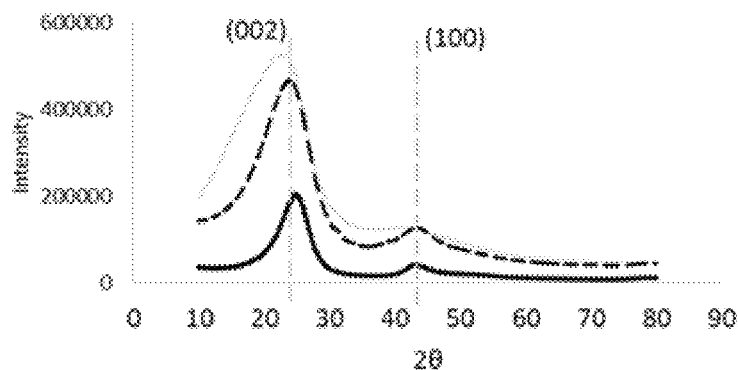
FIGS. 5A to 5C show XRD spectra of, where
Figure 5B:
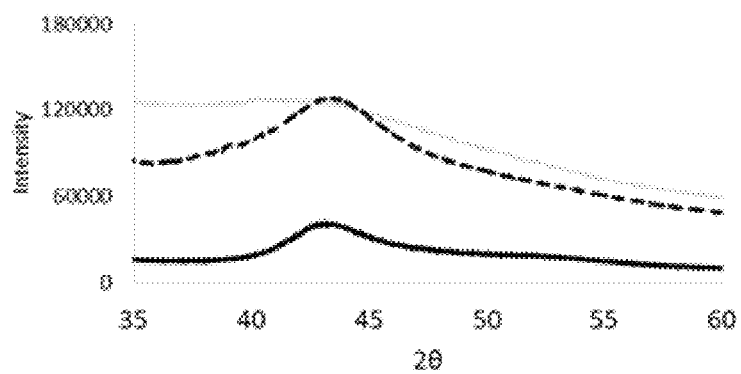
Figure 5C:
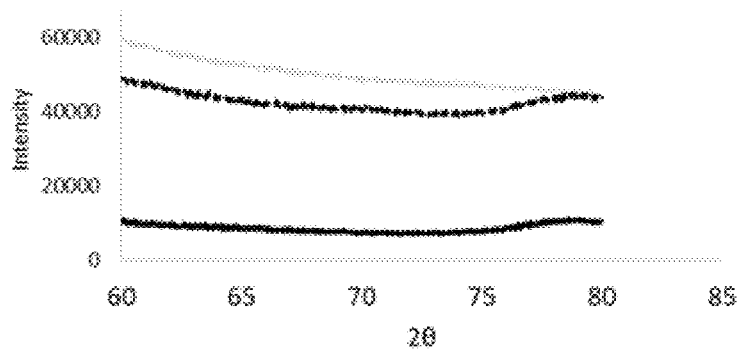
Figure 6A:
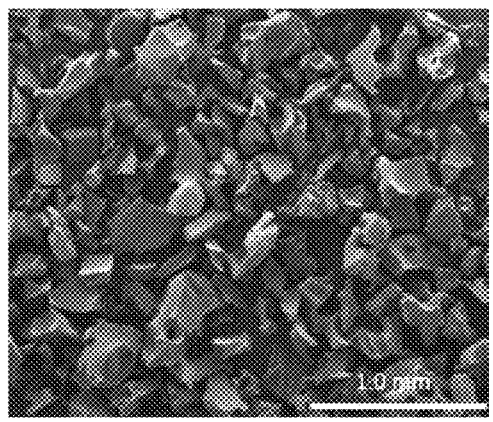
FIGS. 6A to 6D shows SEM images of calcined switchgrass distillate bottoms at various magnifications, indicative of sponge coke morphology as described below, where
Figure 6B:
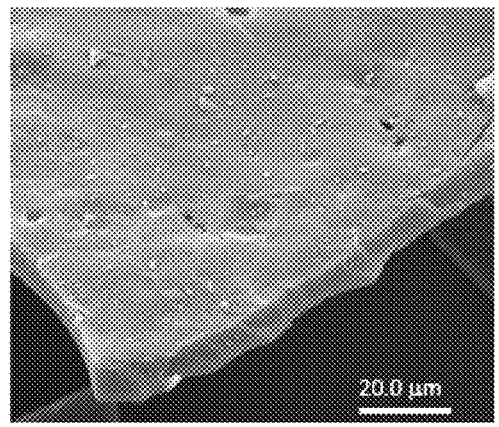
Figure 6C:
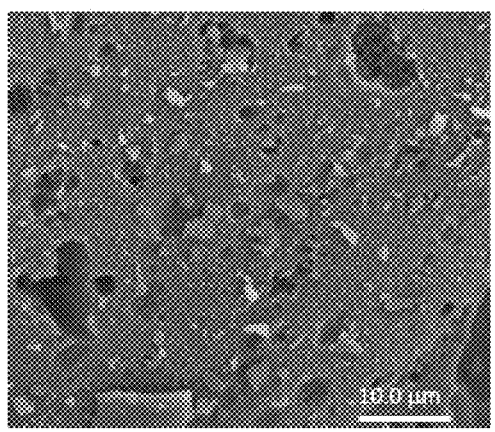
Figure 6D:
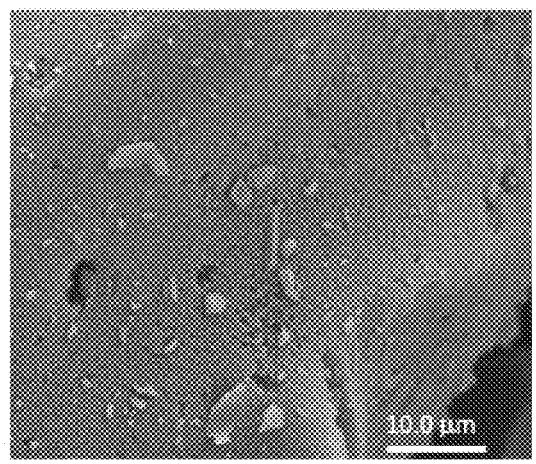

Crystallinity: Since calcination aims to improve the morphology of fixed carbon, it was expected that the calcination process would quantitatively improve the structural order. In this regard, XRD is another critical method for assessing any crystalline structures and/or hierarchical order. XRD was used to examine distillate bottoms at each stage of the calcination process. FIG. 5 displays XRD spectra from switchgrass-derived distillate bottoms taken at each step of the calcination process. Graphitic domains arrange according to a hexagonal structure, so this structure was taken as the basis for interpretation (Li, Z. Q., et al., Carbon, 45: 1686-1695 (2007)). The (002) peak at 2θ=22-26° indicated interlayer scattering across sheets within a graphite crystallite, whereas the (100) peak at 42-44° emanated from intralayer scattering across the sheet (Adelhelm, P., Sci. Technol. Adv. Mater., 13: 1-8 (2012)). As the heat treatment of bottoms progressed, the (002) peak gradually decreased in full width at half maximum (FWHM) (FIG. 5A), indicating a gradual increase in crystallite size. Similarly, the (100) peak appeared after devolatilization, then became more defined into two separate peaks upon calcination (43 and 52° FIG. 5B). A similar trend was seen for the peak at 78° (FIG. 5C). To calculate the crystallite grain sizes $L_c$, and $L_a$, we can use the equations (1) emanating from the ASTM standard for evaluating coke crystalline grain size.

When employing equation (1) from the ASTM standard of calculating $L_c$, the crystallite dimensions are directly comparable to any analysis of industrial calcined coke. While the final crystallite sizes (Table 4) for comparative methods of calcination were slightly less than the target values of 24 A, the results illustrated the positive effect of calcination on crystalline structure, by way of the gradual increases in $L_c$. In particular, switchgrass-based samples showed the greatest increases of crystallite dimensions. Even better crystallite properties are expected to arise from longer calcination times and/or greater temperatures (e.g., about 1,200° C. to about 1,400° C. (e.g., 1,200° C. to 1,400° C.), about 1 to about 4 hr (1 to 4 hr)) because the crystallite dimensions each follow tightly linear trends with respect to processing temperature (Feret, F. R., Analyst, 123: 595-600 (1998); Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000). However, the new methods of calcination disclosed herein produce surprisingly desirable and acceptable texture, as indicated by polarized light microscopy.

$$L_c = \frac{0.89\lambda}{\Delta\cos\theta_{(002)}} \quad (1)$$

$$L_a = \frac{1.84\lambda}{\Delta\cos\theta_{(100)}}$$

Morphology by SEM: Variations in coke morphology play critical roles in their end-use properties. Sponge coke, a coke that is highly porous with a sponge-like appearance, is predominantly preferred in the petcoke industry. Aluminum smelting anodes rely on the sponge coke porosity for diffusion and adhesion of additives like pitch and binders into the coke before the anode is fully baked into a finished product (Ellis, P. J., and C. A. Paul, "Tutorial: Petroleum Coke Calcining and Uses of Calcined Petroleum Coke," IN AIChE 2000 Spring National Meeting, Third International Conference on Refining Processes, Session T9005, Atlanta, Ga., 2000). In contrast, shot coke consists of hard pellets (2-4 mm), which is undesired for many applications. We assessed the morphology of coke samples via images taken by SEM (FIGS. 6A to 6D). The largest magnification image showed that the fragments were irregularly shaped and sized to much less than the 1 mm scale bar, in contrast to the large pellets found in shot coke. Higher magnification images revealed predominant sections of coke with bubble-like appearances, in addition to a porous structure reflective of sponge coke morphologies. There was uniqueness in the SEM data since nearly all of the calcined coke was "sponge coke" morphology, and the prior art has all products being a mixture of sponge coke and shot coke morphologies. While BET surface area measured to be relatively low for devolatilized samples (10-20 m$^2$/g), wider variations occurred for some calcined samples (150-300 m$^2$/g). Low porosities are desired, so optimization of both the temperature heat-up rate and post-calcination grinding steps may be necessary (Ellis, P. J., and C. A. Paul, "Tutorial: Petroleum Coke Calcining and Uses of Calcined Petroleum Coke," In AIChE 2000 Spring National Meeting, Third International Conference on Refining Processes, Session T9005, Atlanta, Ga., 2000); Cannova, F., et al., "Calcined coke particle size and crushing steps affect its vbd result," IN Light Metals 2011, Wiley, 2011, pp. 937-939).

Electrical conductivity: Ultimately, an assessment of end-use applications for calcined distillate bottoms requires measurement of end-use properties. To this end, electrical conductivity measurements were performed on switchgrass samples calcined in one-step. These samples effectively kept the calcined coke constricted to a solid porous phase that was amenable to cutting and shaping. Long rectangular samples were cut out in order to ensure accurate resistivity calculations, and a colloidal silver paint on opposing faces ensured even distribution of current flow across the sample width. When applied to samples of various dimensions and aspect ratios, an apparent resistivity value of 1.5 mΩ-m (+/−0.34) was obtained, which surprisingly meets the requirements for calcined coke properties. If we further consider that the calcined material comprises of a porous network with air (an insulator) filling the voids, the resistivity reduces even further, in proportion to the porosity.

Figure 7A:
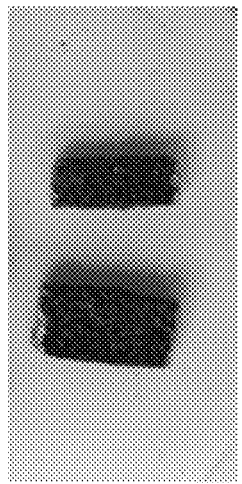
FIGS. 7A and 7B show examples of biorenewable calcined coke, where

FIG. 7A shows representative cut samples of biorenewable calcined coke used for resistivity measurements. The

TABLE 4

Crystal size parameters of distillate bottoms, calculated based on XRD results.

| length | as-is | | | | devolatilized | | | | calcined | | | |
|---|---|---|---|---|---|---|---|---|---|---|---|---|
| (A) | SwG | SwG-R | Eucal | Guay | SwG | SwG-R | Eucal | Guay | SwG | SwG-R | Eucal | Guay |
| d | 3.81 | 4.03 | 3.98 | 3.73 | 3.68 | 3.83 | 3.66 | 3.69 | 3.57 | 3.76 | 3.80 | 3.61 |
| $L_c$ | 7.4 | 8.6 | 7.2 | 11.5 | 9.3 | 8.5 | 11.3 | 9.5 | 14.7 | 9.3 | 10.1 | 11.1 |
| $L_a$ | 15.7 | 14.0 | 21.3 | 21.9 | 23.6 | 21.3 | 22.0 | 31.9 | 55.7 | 33.7 | 37.0 | 23.4 | ends where resistance measurements were taken were first coated with silver paint to allow for uniform current distribution upon current entry and exit. The resistivity ρ is calculated from equation (S1):

$$\rho = R\frac{wh}{l} \quad (S1)$$

Figure 7B:
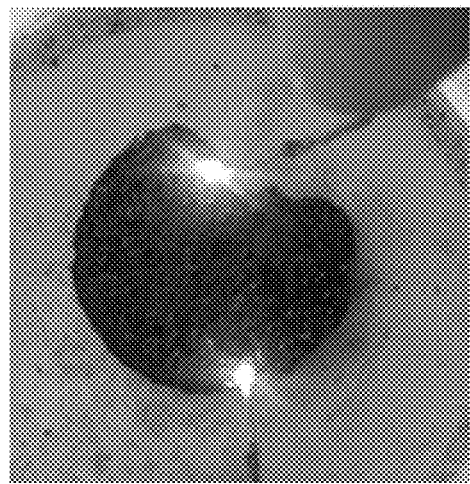
Figure 8:
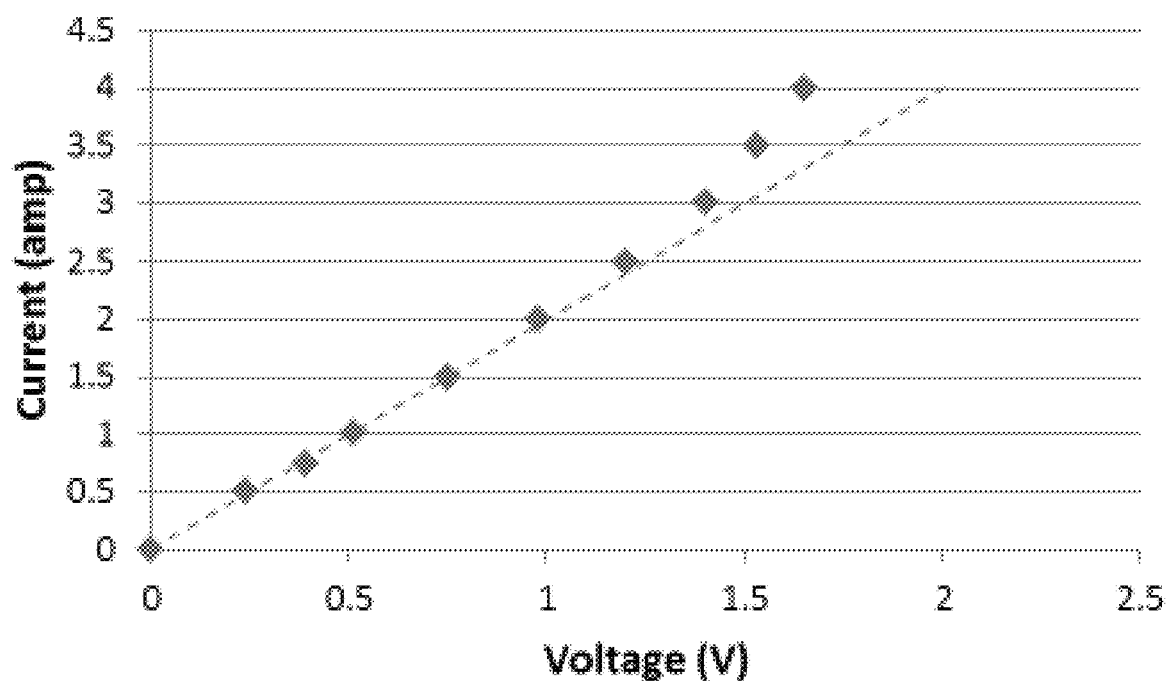
FIG. 8 shows measurement of a current-voltage (I-V) curve for a piece of biorenewable calcined coke as described below (having disk dimensions: d=30.3 mm; t=4.3 mm).

FIG. 7B is a visual example of how efficiently the calcined product conducted electricity. When connecting two metal wires to the terminals of a 6V battery, simply touching the ends of these wires to the calcined product produced a glow due to current flow. To quantify the performance as an electrical conductor, a uniform solid disk of biorenewable calcined coke was connected to a variable DC current source and multimeter probes were simultaneously connected to the DC connection clamps. As the current was incrementally increased, the voltage increased in a linear fashion (FIG. 8). After the DC current reached 2.5 amperes, the trend deviated from linear due to increasing temperatures from resistive heating. Since this example did not use a clear geometry for current entry and exit, resistivity values cannot be easily calculated from the I-V curve.

It is important to note that for the starting bottoms material and for the bottoms samples that were only devolatilized, none of the aforementioned electrical behaviors were observed. Hence, the calcination process was critical for influencing the final product properties.

Measurement of metals via x-ray fluorescence (XRF) of the ash provided a direct method for high-resolution measurement, provided that the original concentrations are back-calculated correctly. Sulfur cannot be measured in this method since ashing oxidizes the sulfur into a gaseous product. Table 5 shows XRD direct measurements on the calcined coke itself alongside the results from ash XRF. These values confirm and/or are similar to each other. With the exception of copper, both the direct and ash measurements fall within 500 ppm of each other. Furthermore, sulfur was surprisingly measured to be 306 ppm, which also confirmed the sulfur concentration that is below the 500 ppm threshold for the previous method of sulfur detection.

TABLE 5

Comparison of XRF elemental concentrations in SwG calcined coke, as measured directly on the sample vs. measured from the sample ash

|    | SwG-calcined f/sample | SwG-calcined, f/ash |
|----|----|----|
| Na | 194 |  |
| Mg |  |  |
| Si | 507 | 884 |
| P  |  |  |
| S  | 306 |  |
| K  | 258 | 296 |
| Ca |  | 250 |
| V  |  |  |
| Fe | 941 | 1424 |
| Ni | 259 | 220 |
| Cu | 1012 | 432 |

Experimental for Table 6: A one-step calcination procedure followed, where the distillate bottoms were heated in an inert $N_2$ environment at about 480° C. for 20 min, then heated to 1,200° C. for 2.5 hr, then gradually cooled back to 600° C. before removal. Table 6 shows elemental and ash testing results for yet a fourth feedstock of horse litter TGRP bio-oil. When calcined for a longer time (2.5 hr), the carbon purity attained was surprisingly the highest from all other previously mentioned results (98.6% C) Similarly, the % oxygen at 0.4% was surprisingly the lowest attained.

TABLE 6

Proximate and total analysis of bottoms obtained from distilling horse litter TGRP oil.

|  | Horse litter bottoms | Horse litter bottoms, calcined |
|---|---|---|
| C | 79.07 | 98.64 |
| H | 5.66 | 0.23 |
| N | 1.27 | 0.72 |
| O | 14.00 | 0.41 |
| S |  | <0.05 |
| % ash |  | 0.49 |

Thus in this study, it was demonstrated a straightforward conversion of bio-oil distillate bottoms into calcined coke. The higher heating values of distillate bottoms produced "as-is" significantly exceeded that of coal or petroleum coke (HHV=36 MJ/kg, vs. 27 MJ/kg). To evaluate its uses other than fuel, the solid residue was subjected to calcination at 1200° C. for 1 hour under $N_2$ atmosphere. The resulting solid product named "biocoke" was composed of 96-99% carbon, was free from sulfur (<500 ppm), and contained 0.2-1.1% ash. X-ray diffraction of the biocoke confirmed a steady increase in grain size with both devolatilization and with calcination. FTIR spectroscopy indicated a total loss of functional groups with the calcination step, except two broad peaks representing C—C and C—O. Temperature programmed oxidation (TPO) of the bottoms before and after calcination illustrated an increasing structural order via the increasing temperature(s) necessary to oxidize the samples. Images from SEM revealed a bubbly morphology similar to the industrially-favored sponge coke. The electrical resistivity of calcined coke samples measured to be <1.5 mΩ-m, which falls in line with specifications for carbon anodes. Biorenewable calcined coke is an improved alternative to petroleum coke and can find application in carbon anodes, steel carburization, and graphite synthesis.

Example 5

Materials and Methods

Pyrolysis. Fast pyrolysis of biomass was conducted using a fast pyrolysis tail-gas reactive pyrolysis process, according to previously published protocols (Mullen, C. A., et al., "Production of deoxygenated biomass fast pyrolysis oils via product gas recycling," Energy and Fuels, 2013, 27, 3867-3874). Briefly, dried biomass was fed through a fluidised sand bed reactor (temperature: 500° C., $N_2$ atmosphere) at a rate of 2 kg/h. Any solid char particulates were separated by subsequently passing the vapors through a cyclone, after which compounds with a low boiling point were collected in a series of cold-water condensers and remaining oil entrained in the non-condensable gases was precipitated by electrostatic precipitation (ESP). All experiments used the biomass-derived oil obtained from the ESPs. Using a preheater and gas blower, the remaining gases were recycled back into the reactor at a rate of 50 to 70%.

Coking. Prior to coking, light components of pyrolysis oils were removed by distillation (final temperatures for various biomasses noted in Table 7). Oil was heated gradually in stages, with the temperature being held for 30 minutes each at 200° C., 250° C., 275° C., 300° C., and 325° C., or until the final temperature noted in the table was reached, then cooled down to room temperature. Afterwards, the distillation residues were heated under argon with a rate of 16° C./min to a final temperature of 900° C. Once this temperature was reached, the samples were allowed to cool down.

TABLE 7

Oxygen Content of Bio Oil and Coke

| Pyrolysis Feedstock | Oxygen Content [Mass %] | | Distillation Temperature [° C.] | Coke Texture |
|---|---|---|---|---|
| | Bio oil | Distillation Residue, Coker Feed | | |
| Willow | 14 | n.d. | 250-325 | Isotropic/Anisotropic |
| Guayule | 15 | 8.1 | 225 | Isotropic/Anisotropic |
| | | 8.0 | 250 | Isotropic/Anisotropic |
| | | 7.0 | 275 | Isotropic/Anisotropic |
| | | 6.8 | 300 | Isotropic/Anisotropic |
| | | 7.0 | 325 | Isotropic/Anisotropic |
| Guayule | 19 | 8.0 | 311 | Isotropic/Anisotropic |
| Switchgrass | 23 | 18.3 | 250 | Amorphous |
| | | 17.0 | 275 | Amorphous |
| | | 16.0 | 300 | Amorphous |
| Red Pine | 23 | n.d. | 250-380 | Amorphous |
| Hardwood | 27 | 20.4 | 225 | Amorphous |
| | | 19.8 | 250 | Amorphous |
| | | 18.2 | 275 | Amorphous |
| | | 17.1 | 300 | Amorphous |
| | | 15.2 | 325 | Amorphous |
| Woody biomass | 30 | n.d. | 311 | Amorphous | n.d. Not determined

Oil and Coke Characterization. Elemental analysis (CHNS) was conducted using a Thermo EA1112 CHNS analyser. The oxygen content was calculated by difference. For microscopic analysis of coke, the coke particles were embedded in epoxy resin and successively mechanically polished until usage of colloidal silica (0.05 µm) in the final step. Optical images were recorded with a LEICA DMI500M reflected light microscope equipped with a ¼ wave plate retarder. The samples were observed in air, and no oil immersion method was used. Examination of specimens was done with a magnification between 25× and 500×. Additional details of the analysis method can be found elsewhere (see e.g., Innus, A. et al., "A Method for the Rapid Characterisation of Petroleum Coke Microstructure Using Polarised Light Microscopy," Light Metals, 2013, 1069-1073).

Results and Discussion

Oil Oxygen Content. Although pyrolysis of different biomass feeds was performed in similar conditions, the oxygen content of the corresponding as-received biomass-derived oils varied considerably (see Table 7). A discussion for the reasons why this is the case is outside the scope of this disclosure; however, it is relevant that the tail-gas reactive pyrolysis process yielded biomass-derived oil with a lower oxygen content as compared to conventional fast pyrolysis processes. With some pyrolysis feedstock materials, the biomass-derived oil oxygen content was less than half that of typical values found in biomass-derived oil from conventional pyrolysis (14 vs. >30%; see e.g., Diebold, J.; Bridgwater, A., "Overview of fast pyrolysis of biomass for the production of liquid fuels" in Developments in thermochemical biomass conversion, Springer: Berlin, Germany, 1997; pp 5-2 and Czernik, S.; Bridgwater, A. V., "Overview of Applications of Biomass Fast Pyrolysis Oil", Energy & Fuels, 2004, 18, 590-598). Distilling off light components further reduced the oxygen content, suggesting that oxygen was concentrated in low-boiling compounds of the biomass-derived oil. The biomass-derived coker feed contained nearly no S. Thus, its combined oxygen and sulfur concentrations were only very slightly higher than the oxygen concentrations listed in Table 7. In petroleum-derived coker feed, the combined oxygen and sulfur concentrations are typically about 2 to 4% (see e.g., Rhedey, P. J. & Nadkarni, S. K., "Coker Feedstock Characteristics and Calcined Coke Properties," Light Metals, 1984, 859-868). This oxygen concentration is much lower than the lowest oxygen concentration found in the biomass-derived coker feed of the present study.

Figure 9A:
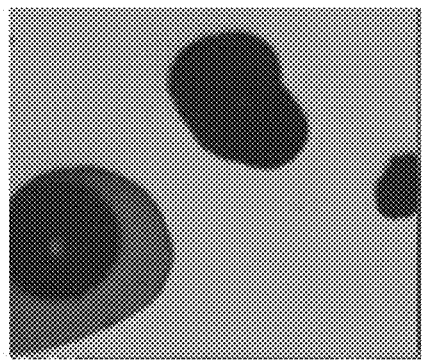
FIGS. 9A to 9D illustrate textures of various cokes with optical micrographs, where
Figure 9B:
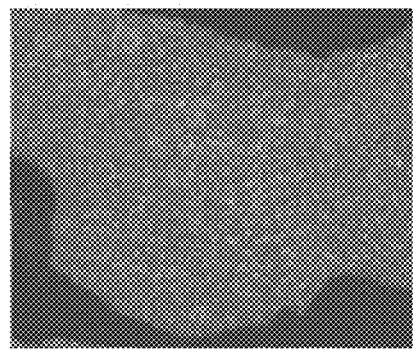
Figure 9C:
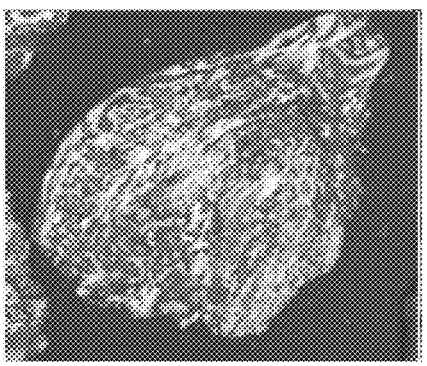
Figure 9D:
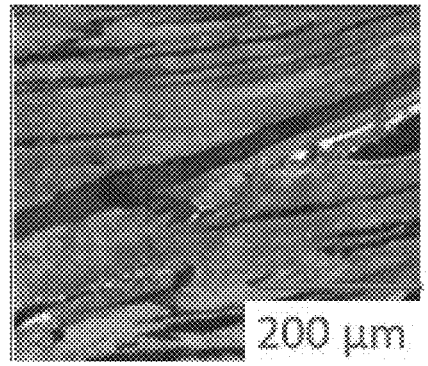

Coke Texture. Coke texture typically depends on the combined oxygen and sulfur concentrations of the corresponding feedstock, where anisotropy increases with decreasing combined oxygen and sulfur concentrations (see e.g., Monthioux, M., "Structure, texture, and thermal behaviour of polyaromatic solids," in Carbon Molecules and Materials, Taylor & Francois: London, UK and New York, N.Y., USA, 2002). Before the texture of biomass-derived coke is discussed, coke textures are briefly reviewed. With increasing order, textures might be classified as amorphous, isotropic, anisotropic sponge, and anisotropic needle (see FIG. 9 for optical micrographs, where FIG. 9A illustrates amorphous texture, FIG. 9B shows isotropic texture, FIG. 9C illustrates anisotropic sponge texture, and FIG. 9D shows anisotropic needle texture). The CTE and corresponding susceptibility towards thermal shock cracking generally decreases in the same order. Due to its high CTE, amorphous coke normally cannot be used in anodes. Isotropic coke is generally acceptable in blends with sponge coke (the most widely used texture in the production of anodes). Finally, needle coke is normally too expensive for anodes and its application is usually limited to applications where a low CTE is critical, such as in electrodes for electric arc furnaces (see e.g., Frohs, W.; Jager, H., "Needle Coke—Story of Tomorrow," 12th Annual Petcoke Conference, San Antonio, Tex., USA, 2013). Anisotropic coke is therefore the most desirable for many applications.

Figure 10:
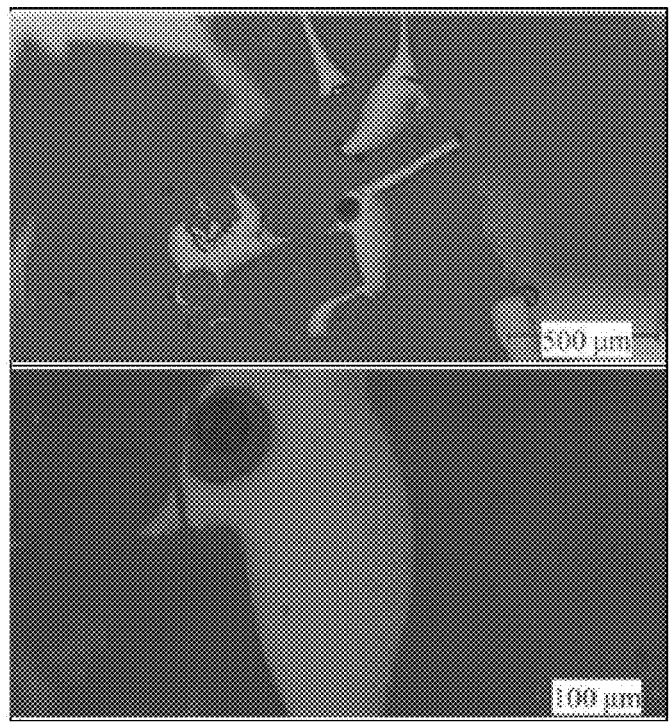
FIG. 10 shows photomicrographs to illustrate the texture for biocoke from 23% oxygen content bio-oil.

High-O Biomass-Derived Oil. In cokes made from high-O biomass-derived oil (e.g., biomass with greater than about 18% oxygen in the bio-oil), mostly amorphous textures were found. Examples of photomicrographs to illustrate the texture for red pine biomass (23% oxygen in the bio-oil, see Table 7) are presented in FIG. 10 (photomicrograph of coke produced from red pine-derived oil, distilled at 250° C. for 20 minutes). As mentioned above, biomass-derived oil from the same pyrolysis run was distilled at different temperatures. In cokes from biomass-derived oils distilled at alternate conditions, traces of isotropic and sponge textures were found (not shown). Nevertheless, the concentration of sponge textures was much too low to use that type of coke in anodes.

Figure 11:
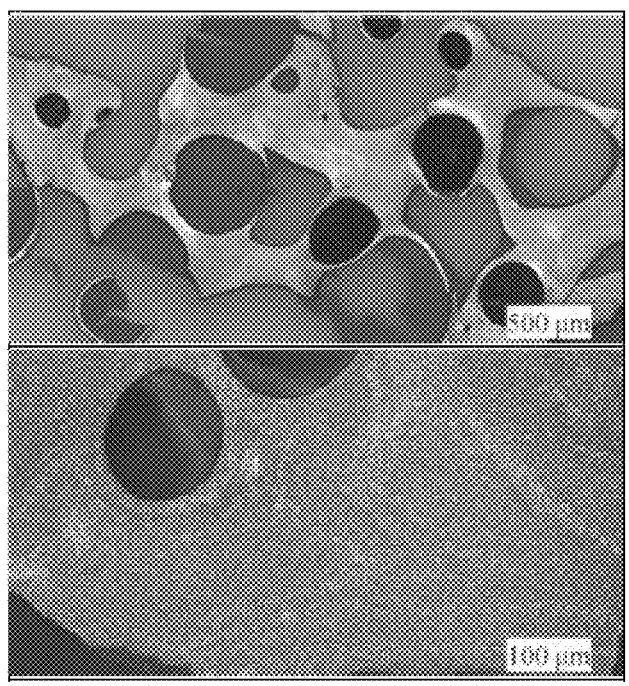
FIG. 11 illustrates photomicrographs of coke produced from willow-derived oil with isotropic textures, which started to show signs of transition to anisotropic textures.
Figure 12A:
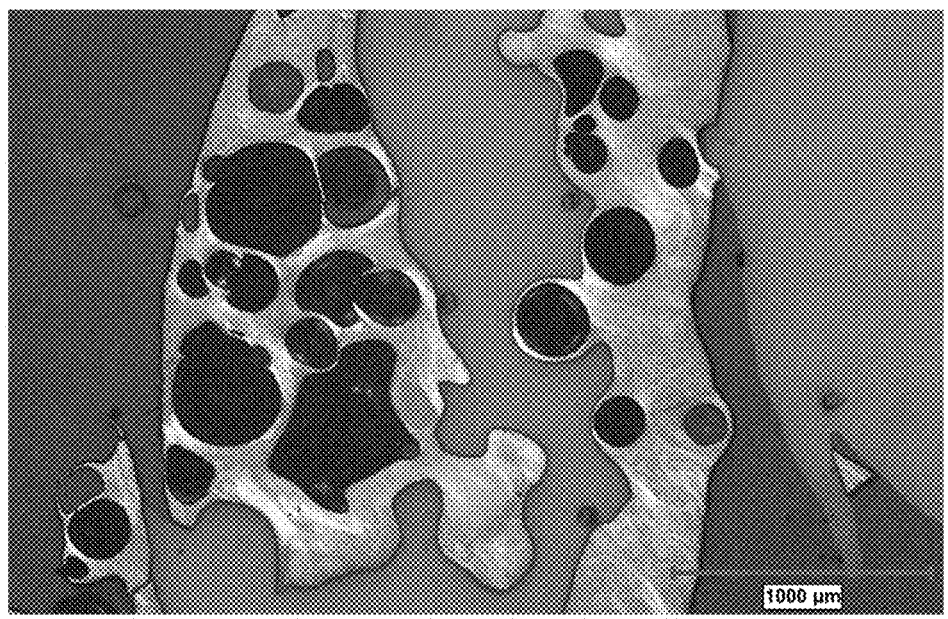
FIGS. 12A to 12D show photomicrographs of biocoke from willow bio-oil.
Figure 12B:
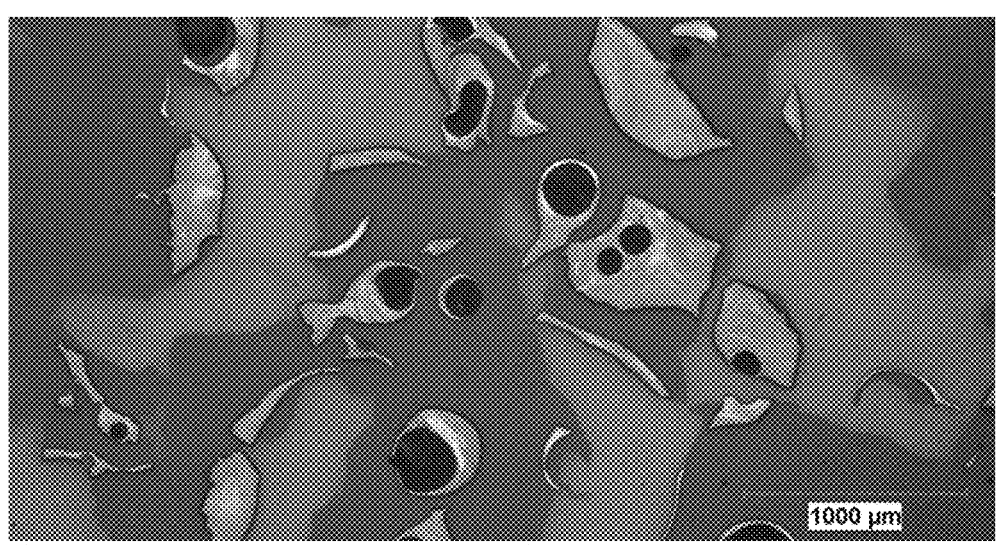
Figure 12C:
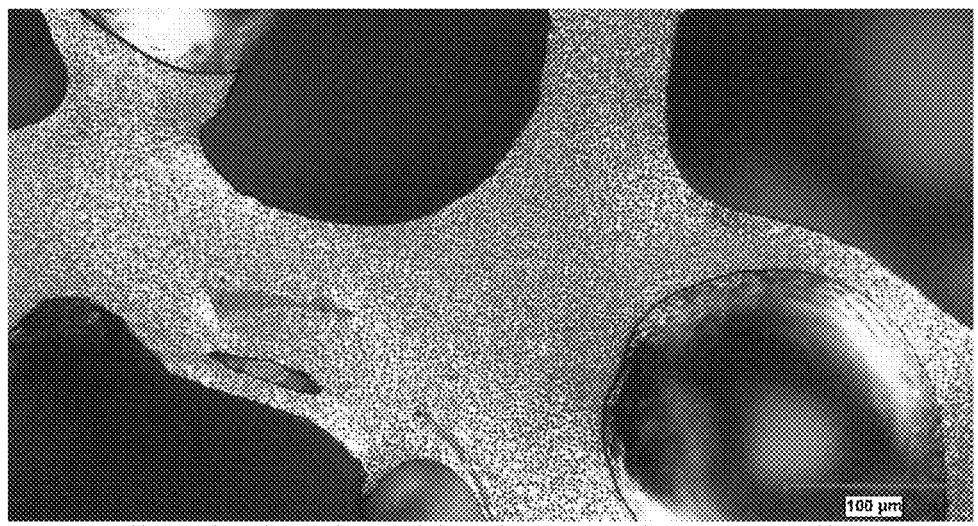
Figure 12D:
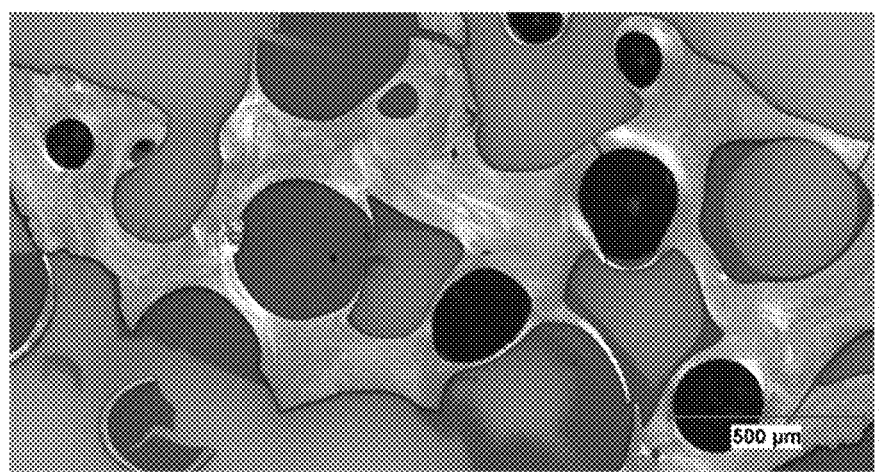
Figure 13A:
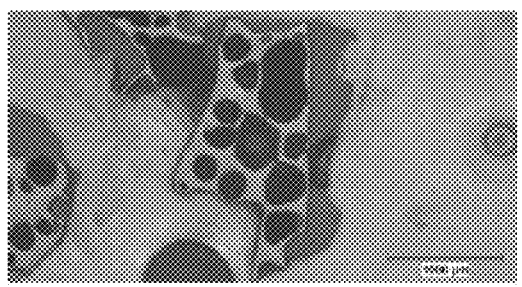
FIGS. 13A to 13D show photomicrographs of biocoke from guayule bio-oil.
Figure 13B:
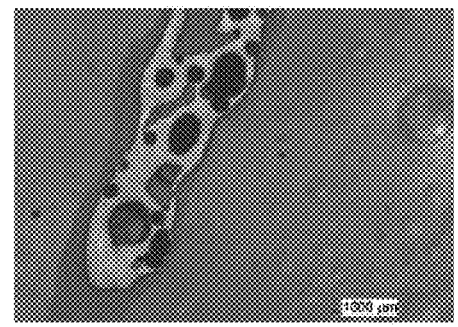
Figure 13C:
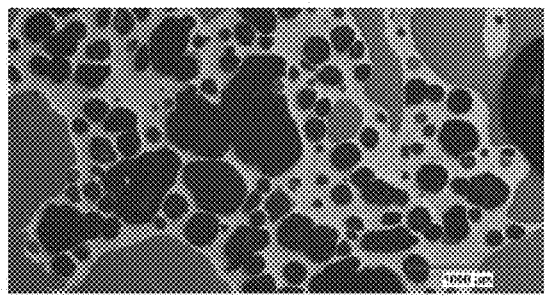
Figure 13D:
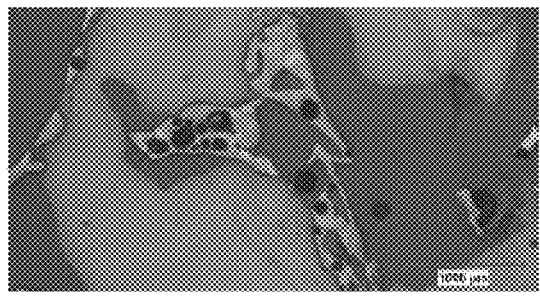

Medium High-O Biomass-Derived Oil. The as-received oil from willow biomass contained 14% oxygen (see Table 7Table) and is here classified as medium high-O biomass-derived oil (e.g., oils with up to about 17% oxygen content). The corresponding cokes had isotropic textures, which started to show signs of transition to anisotropic textures (FIG. 11—photomicrograph of coke produced from willow-derived oil, distilled at 250° C.). It was assumed that the CTE was situated between those of isotropic and sponge coke. Blends of isotropic and sponge cokes are already successfully used on commercial scale in anodes; therefore, the biomass-derived coke as shown in FIG. 11 would likewise be useful in applications in anodes, at least as a blend component. For residues from highly-oxygenated oils, the oil distillation conditions had no significant impact on the textures of the corresponding cokes.

Summary and Conclusions. Use of biomass pyrolysis-derived material in anodes would have significant advantages, including a reduced carbon footprint and very low concentrations of undesired elements (S, V, and Ni). However, char (solid pyrolysis residue) contains undesired ash, has a low bulk density, and undesired texture. It is therefore not a suitable anode filler. Cokes made from oil produced by conventional pyrolysis are high in oxygen, which results in undesired textures. The oil oxygen content can be reduced by performing pyrolysis with tail gas recycling. The biomass type also had an important impact on the oil oxygen content. In the present examples, several cokes were made from tail-gas reactive pyrolysis oil. Coke made from the biomass-derived feed with the lowest oxygen concentration had isotropic textures with signs of transition to the desired anisotropic textures. Based on the fact that isotropic coke is already blended in commercial anodes with anisotropic sponge coke, it is believed that, by tail-gas reactive pyrolysis of certain biomass materials, anode grade coke can be made. In addition to the pyrolysis process and the biomass, the distillation conditions of the coker feed also influence the coke texture. In the range studied, more severe conditions favored a more anisotropic texture, especially when the texture was not well developed.

Example 6

FIGS. 12A to 12D show photomicrographs of willow bio-oil. Bio-oil was subjected to heating in a static furnace under nitrogen atmosphere at a rate of approximately 16-20° C./min until a temperature of 200° C. was attained and held for 20 minutes. Then, the temperature was raised to 250° C., 275° C., and 300° C. and held for at least 20 min at each temperature. At each temperature, at least one sample was removed for analysis. Some samples remained at 300° C. and/or 325° C. for 14+ hours before removal.

FIGS. 13A to 13D show photomicrographs of guayule bio-oil. Bio-oil was subjected to heating in a static furnace under nitrogen atmosphere at a rate of approximately 16-20° C./min. The temperature was raised and sequentially held for 30 minutes each at 225° C., 250° C., 275° C., 300° C., and 325° C., with various samples removed from heat at each temperature.

Conclusions: It was demonstrated the synthesis and end-use properties of calcined coke obtained from bio-oil distillate bottoms. From the various bio-oils that were distilled, it was surprisingly found that the bottoms were converted from various bio-oils into products nearly identical in composition and structure. These calcined cokes were surprisingly superior to calcined petroleum coke by virtue of, for example, their low sulfur (trace amounts) and metals content (0.2-1.1 wt %). TPO studies confirmed the progressive stabilization and structural ordering that the calcination process introduced into the distillate bottoms. A one-step calcination process was preferred, wherein the devolatilized samples were immediately calcined in situ. Significant crystallite growth occurred for both devolatilization and calcination steps, verified by XRD. SEM images revealed a highly porous structure within sub-mm particles that renders that coke useful for mixtures with carbon anode binders. The electrical conductivity of biorenewable coke enables its application as a valuable substitute for calcined petroleum coke. The lack of any need for desulfurization makes this a valuable process for many industries that use calcined petroleum coke. Holding the partially devolatilized bio-oils at particular temperatures for sufficient times ensured the formation of anisotropic domains. It is worth mentioning that vacuum distillation was not employed, and that this omission likely contributed to the anisotropic texture formation, since application of a vacuum bypasses the temperature regime needed.

Example 7

Figure 14:
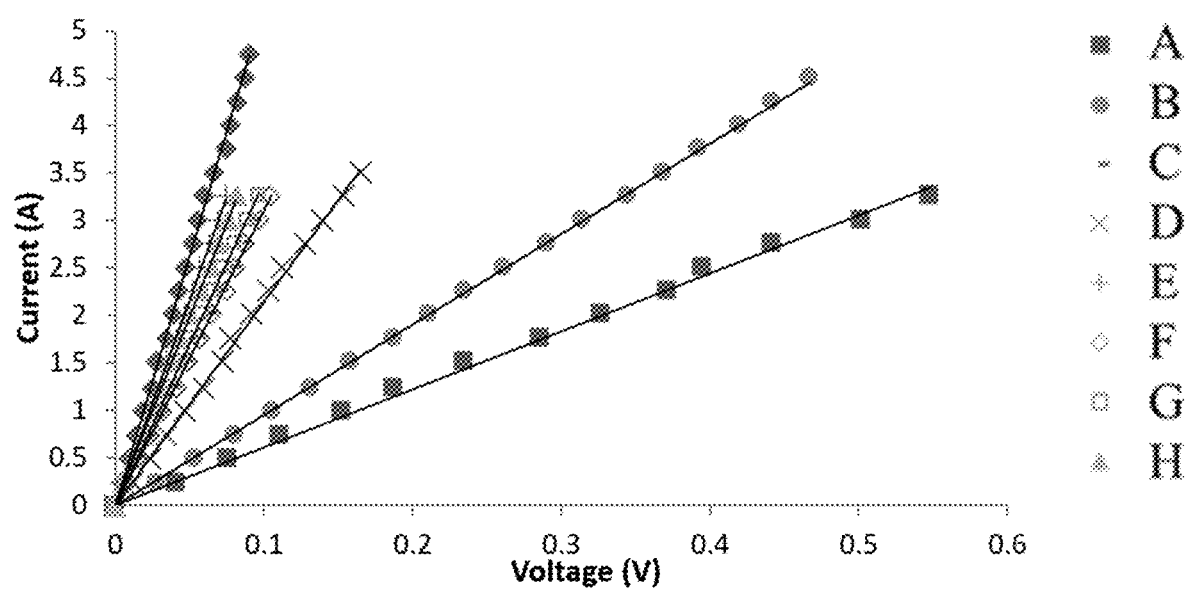
FIG. 14 shows I-V curves for calcined blocks of bio-oil distillation residues.

Solidified calcined biocoke made using the methods of the invention was measured either directly or as part of calcined mixtures with coal tar pitch. Solid portions of calcined petroleum coke were measured directly as-is. Each sample was cut and sanded into rectangles, with each dimension measured to within 5% accuracy. A layer of colloidal silver paint was applied to each end of the lengthwise dimension where electrical leads were applied. DC current was introduced using a CE Compass 305D variable DC power supply, and associated voltages were measured with a Cen-Tech P37772 multimeter. At increments of 0.5 amps, voltage readings were taken, until at least 3 amps were attained. I-V curves were plotted from the data, with the linear slope corresponding to the inverse resistance. Sample dimensions and resistance values were used to calculate resistivity. Calcined petcoke pieces served as the control reference. While porosity does contribute negatively to electrical resistance, coking procedures proceeded slowly enough to ensure minimal macroscopic pores left in the products. The measurements also served as a conservative estimate of actual resistivity, in that the actual resistivity will fall to a lower value. Incremental current-voltage readings served to provide a linear curve that produces resistance value that is valid over all current values. The procedure periodically cycled between specific current values and zero current in order to prevent overheating that can cause artificial reductions in resistance. Table 8 shows sample prep information, as well as resistivity values measured for the baked coke/pitch composites. Coal tar pitch served as the binder for formation of uniform pieces. Without coal tar pitch, samples tended to crumble due to pressure of cutting and sanding samples. This procedure did not include optimization of coke granulometry, pitch content, and mixing conditions. Furthermore, no high-pressure compaction of the green composite was performed. Consequently, the resistivities of the present work are higher than those generally found for laboratory anodes made by the Al industry (see e.g., Lubin, M L, et al, "CPC Testing and Relationship Between Coke and Anode Physical Properties," *Light Metals*, pp. 1193-1202, 2017). All of the I-V curves in FIG. 14 (A-H labels correspond to samples in Table 8) showed tightly linear trends, indicating the uniformity and predictability of the materials.

TABLE 8

Resistivity Values for Biocokes

| | Resistivity (μΩ * m) | dwell length (hr)[1] |
|---|---|---|
| regular bio-oil + 15% CTP (A) | 366 | 3.2 |
| guayule + 17% CTP (B) | 389 | 2 |
| calcined petroleum coke[2] (C) | 142 | — |
| guayule + 25% CTP (D) | 236 | 3 |
| horse litter + 15% CTP (E) | 175 | 4 |
| horse litter[3] + 15% CTP (F) | 194 | 19 |

TABLE 8-continued

Resistivity Values for Biocokes

|  | Resistivity (μΩ * m) | dwell length (hr)[1] |
|---|---|---|
| horse litter + 15% CTP (G) | 173 | 19 |
| switchgrass + 15% CTP (H) | 141 | 22 |

Figure 15A:
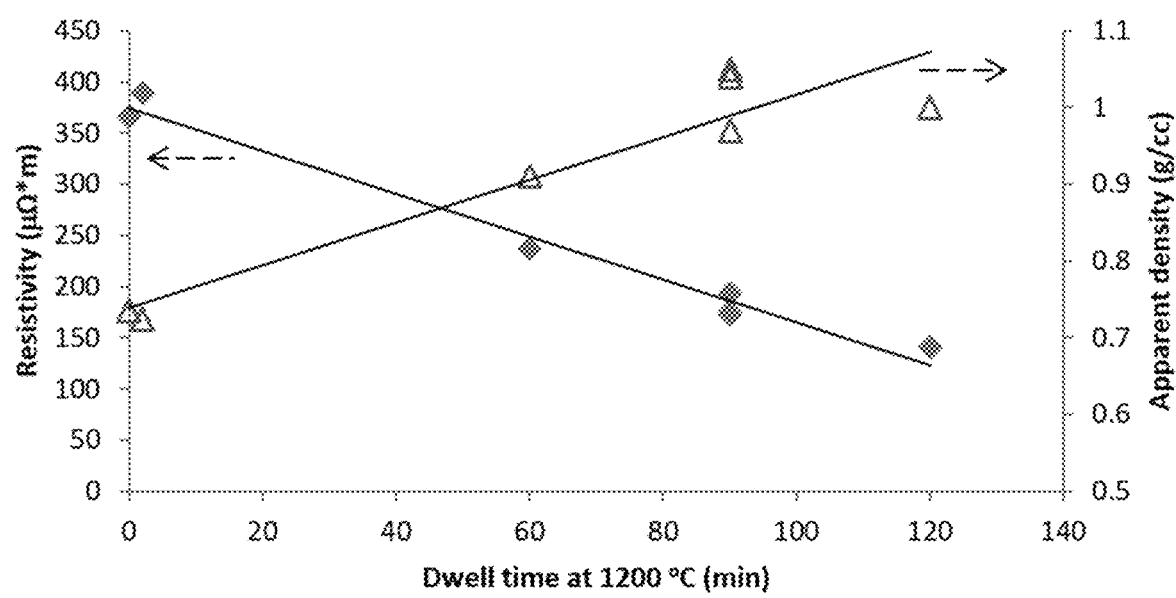
FIGS. 15A and 15B show physical property trends for calcined biocokes baked with coal tar pitch, where FIG. 15A demonstrates dwell time at 1,200° C.
Figure 15B:
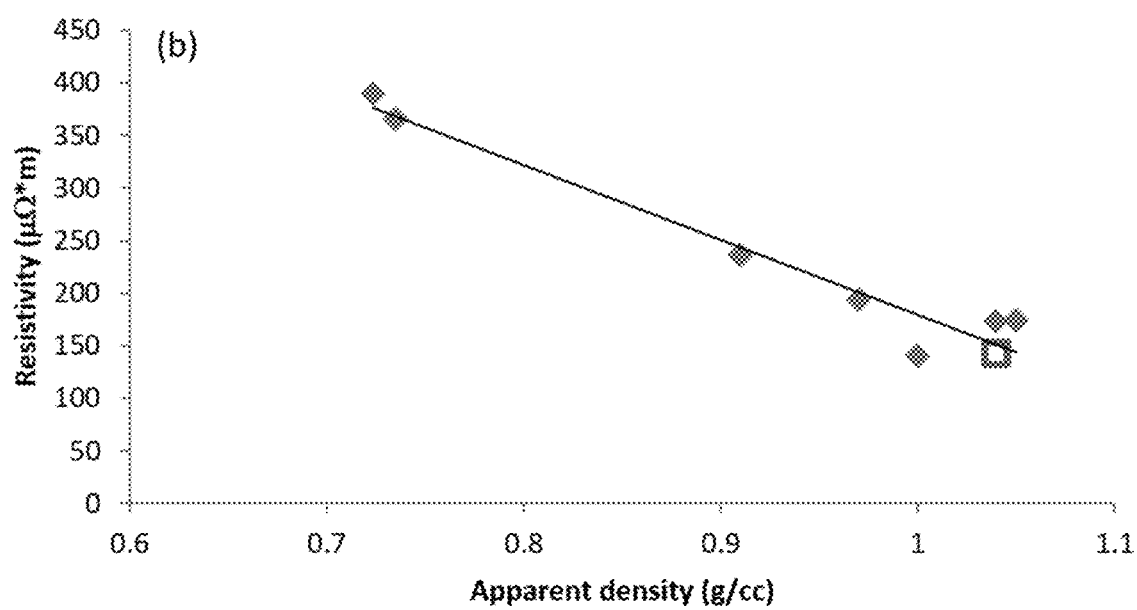

FIGS. 15A and 15B show that the physical properties of a variety of calcining and baking protocols for formation of the final blocks followed clear trends. Among a variety of variables examined, both the resistivity and apparent density correlated most strongly with respect to calcination time at the final temperature of 1,200° C., giving strongly linear trends (FIG. 15A). Traditionally, for low-sulfur calcined petcokes, resistivity follows an inversely linear trend with respect to the calcination temperature, while density is directly proportional to temperature. Little variation usually exists with respect to an industrial calciner's residence time, but the calcination temperature can be varied. However, altering the dwell time at the calcination temperature will project similar trends as the temperature itself, due to the kinetic effect (i.e., longer reaction times at lower temperatures can produce results similar to that of shorter reaction times at higher temperatures). Overall, the ramping protocol appears more beneficial for texture and density than for resistivity. Since the calcined petcoke control sample was measured as-is, the resistivity and density properties were compared to each other (FIG. 15B) and a calcined petcoke sample was included as a reference point (open square in FIG. 15B). This linear trend follows what is found for calcined petcokes, and the reference point aligns with the biocoke trend, indicating potential for surprisingly effective property prediction and control of biocokes. Also, forming baked calcination beyond 1,200° C., is of particular interest due to the depletion of sulfur from biocoke. For anode-grade coke, calciners typically do not calcine beyond 1,300° C., due to the sulfur content. The rate of thermal desulfurization dramatically increases beyond 1,300° C., which will cause sudden volume expansions (and hence decreases in density) for large volumes of sulfur escaping the coke. Biocoke could potentially allow higher calcination temperatures to take place safely within rotary calciners, without compromise to the product properties.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 30%, preferably by as much as 20%, and more preferably by as much as 10% to a reference quantity, level, value, or amount.

The term "consisting essentially of" excludes additional method (or process) steps or composition components that substantially interfere with the intended activity of the method (or process) or composition. This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms.

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent.

By the term "effective amount" of a compound or property as provided herein is meant such amount as is capable of performing the function of the compound or property for which an effective amount is expressed. As is pointed out herein, the exact amount required will vary from process to process, depending on recognized variables such as the compounds employed and various internal and external conditions observed as would be interpreted by one of ordinary skill in the art. Thus, it is not possible to specify an exact "effective amount," though preferred ranges have been provided herein. An appropriate effective amount may be determined, however, by one of ordinary skill in the art using only routine experimentation.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

The claimed invention is:

1. A method of producing calcined coke from a bio-oil derived from a biomass feedstock, the method comprising:
(a) subjecting the bio-oil to atmospheric distillation in a batch or continuous distillation unit to produce a bio-oil distillation residue; (b) subjecting the bio-oil distillation residue to a temperature and a time sufficient for carbonaceous domains to align and crystallize to produce a calcination-ready coke product; (c) optionally further densifying the carbonaceous domains at up to about 400° C. of the calcination-ready coke product; and (d) calcining the calcination-ready coke product to produce an anisotropic coke product; wherein the method does not include a vacuum distillation step.

2. The method of claim 1, wherein the bio-oil is made using a fast pyrolysis tail-gas reactive process.

3. The method of claim 1, wherein the atmospheric distillation occurs at a temperature less than about 200° C.

4. The method of claim 1, wherein the temperature sufficient for carbonaceous domains to align and crystallize is from about 150° C. to about 400° C.

5. The method of claim 1, further comprising subjecting the bio-oil distillation residue to a temperature from about 200° C. to about 350° C. while the bio-oil distillation residue is in a molten fluid state.

6. The method of claim 5, wherein subjecting the bio-oil distillation residue to a temperature from about 200° C. to about 350° C. for the time sufficient for carbonaceous domains to align and crystallize comprises a time ranging from about 5 min to about 60 min.

7. The method of claim 1, wherein subjecting the bio-oil distillation residue to the temperature and the time sufficient for carbonaceous domains to align and crystallize further comprises subjecting the bio-oil distillation residue to a temperature increase at a rate from about 5° C./min to about 50° C./min until a temperature of about 200° C. to about 350° C. is attained.

8. The method of claim 1, wherein subjecting the bio-oil distillation residue to the temperature and the time sufficient for carbonaceous domains to align and crystallize further comprises subjecting the bio-oil distillation residue to a temperature increase at a rate from about 5° C./min to about 50° C./min until a temperature of about 200° C. to about 350° C. is attained.

9. The method of claim 1, further comprising devolatilizing the calcination-ready coke product.

10. The method of claim 9, wherein devolatilizing the calcination-ready coke product comprises subjecting the calcination-ready coke product to a temperature in a range from about 900° C. to about 1,500° C.

11. The method of claim 1, wherein calcining the calcination-ready coke product to produce the anisotropic coke product comprises heating the calcination-ready coke product over a gradual period of time ranging from about 5 min to about 3 hours to a temperature range from about 1,000° C. to about 1,350° C.

12. The method of claim 1, wherein the biomass feedstock is selected from the group consisting of: lignocellulosic materials, animal waste products, animal waste by-products, and combinations thereof.

13. The method of claim 1, wherein further densifying the carbonaceous domains at up to about 400° C. to produce a calcination-ready coke product further comprises a time ranging from about 5 min to about 60 min.

14. An anisotropic coke product produced using the method of claim 1.

15. A composition comprising an anisotropic calcined coke product having a resistivity value less than about 400 $\mu\Omega$-m, wherein the calcined coke product is derived in the absence of vacuum distillation from at least one biomass feedstock, and wherein the calcined coke product is optionally combined with at least one petroleum-derived coke.

16. The composition of claim 15, wherein the calcined coke product has a sulfur content less than about 500 ppm.

17. The composition of claim 15, wherein the calcined coke product has a vanadium content of less than about 200 ppm.

18. The composition of claim 15, wherein the calcined coke product has a nickel content of less than about 200 ppm.

19. The composition of claim 15, wherein the calcined coke product has an ash content less than about 1.1%.

20. The composition of claim 15, wherein the calcined coke product comprises greater than about 96% carbon and possessing one or more characteristics of calcined petroleum coke and/or mesophase pitch.

21. The calcined coke product of claim 15, wherein the at least one biomass feedstock selected from the group consisting of: willow; guayule; switchgrass; red pine; hardwood; woody biomass; and combinations thereof.

22. The calcined biocoke product of claim 15, further comprising an anisotropic sponge texture.

23. The calcined coke product of claim 15, further comprising an anisotropic needle texture.

24. The calcined coke product of claim 15, wherein the resistivity value is from about 140 $\mu\Omega$-m to about 400 $\mu\Omega$-m.

25. The calcined coke product of claim 15, wherein the resistivity value is from about 141 $\mu\Omega$-m to about 366 $\mu\Omega$-m.

26. A composition comprising an isotropic calcined coke product having a resistivity value less than about 400 $\mu\Omega$-m, wherein the calcined coke product is derived in the absence of vacuum distillation from at least one biomass feedstock, and wherein the calcined coke product is optionally combined with at least one petroleum-derived coke.

* * * * *